US009161281B2

(12) United States Patent
Vrzic et al.

(10) Patent No.: US 9,161,281 B2
(45) Date of Patent: Oct. 13, 2015

(54) METHOD AND APPARATUS FOR MULTI-RAT TRANSMISSION
(71) Applicant: Research in Motion Limited, Waterloo (CA)
(72) Inventors: Sophie Vrzic, Nepean (CA); Noun Choi, Flower Mound, TX (US)
(73) Assignee: BlackBerry Limited, Waterloo, Ontario (CA)
( * ) Notice: Subject to any disclaimer, the term of this patent is extended or adjusted under 35 U.S.C. 154(b) by 204 days.
(21) Appl. No.: 13/780,911
(22) Filed: Feb. 28, 2013
(65) Prior Publication Data
US 2013/0329583 A1 Dec. 12, 2013

Related U.S. Application Data
(60) Provisional application No. 61/657,483, filed on Jun. 8, 2012.

(51) Int. Cl.
*H04L 12/26* (2006.01)
*H04W 36/30* (2009.01)
*H04W 36/00* (2009.01)
*H04W 92/20* (2009.01)
(52) U.S. Cl.
CPC .......... *H04W 36/30* (2013.01); *H04W 36/0066* (2013.01); *H04W 92/20* (2013.01)
(58) Field of Classification Search
None
See application file for complete search history.

(56) References Cited
U.S. PATENT DOCUMENTS

| 8,526,952 | B2 | 9/2013 | Shaheen |
| 8,615,241 | B2 | 12/2013 | Gupta et al. |
| 2004/0203510 | A1 | 10/2004 | Claxton et al. |
| 2005/0050325 | A1 | 3/2005 | Ohkubo |
| 2005/0079884 | A1 | 4/2005 | Lazaridis |
| 2006/0215601 | A1 | 9/2006 | Vleugels et al. |
| 2007/0019575 | A1* | 1/2007 | Shaheen ................. 370/310 |
| 2009/0041247 | A1 | 2/2009 | Barany et al. |
| 2010/0260109 | A1 | 10/2010 | Ulupinar et al. |
| 2011/0194530 | A1 | 8/2011 | Tinnakornsrisuphap et al. |
| 2011/0194535 | A1 | 8/2011 | Johansson et al. |
| 2012/0140638 | A1 | 6/2012 | Zhao et al. |
| 2012/0207100 | A1 | 8/2012 | Hakola et al. |
| 2012/0243462 | A1* | 9/2012 | Bucknell et al. ............. 370/315 |
| 2013/0128778 | A1 | 5/2013 | Bennett |
| 2013/0182555 | A1 | 7/2013 | Raff et al. |

OTHER PUBLICATIONS

Office Action issued in U.S. Appl. No. 13/780,674, on Aug. 7, 2014.
R1-111089 Ericsson, "Spectrum migration from HSPA to LTE", 3GPP TSG-RAN WG1 Meeting #64, Taipei, Taiwan, Feb. 21-25, 2011.
International Search Report and Written Opinion of the International Searching Authority issued in International Application No. PCT/US2013/044271 on Oct. 8, 2013; 11 pages.
International Preliminary Report on Patentability issued in International Application No. PCT/US2013/044271 on Dec. 18, 2014; 7 pages.
Office Action issued in U.S. Appl. No. 13/780,674, on Feb. 10, 2015; 19 pages.

* cited by examiner

*Primary Examiner* — Minh-Trang Nguyen
(74) *Attorney, Agent, or Firm* — Fish & Richardson P.C.

(57) ABSTRACT

A method and apparatus for mobility management, load management, sharing management and configuration update and setup in a mobile network having a first radio access technology node and a second radio access technology node, the first radio access technology node and the second radio access technology node communicating over a backhaul interface. In one aspect the method detects, at the first radio access technology node, that a handover for a user equipment to a new node is required; provides, from the first radio access technology node, handover information to the second radio access technology node over the backhaul interface; and performs the handover of the user equipment from the first radio access technology node to the new node.

27 Claims, 18 Drawing Sheets

METHOD AND APPARATUS FOR MULTI-RAT TRANSMISSION

FIELD OF THE DISCLOSURE

The present disclosure relates to user equipment (UE) devices supporting multiple radio access technologies (RATs) and in particular relates to multi-RAT carrier aggregation.

BACKGROUND

Radio access technologies have evolved through various generations to allow more functionality and higher peak data throughput rates, among other attributes. As new RATs are deployed, the use of legacy RATs that do not have the same functionality as the new RATS will likely begin to decline. The decline in traffic may create white space in frequency bands allocated to the legacy RAT, where the white space could potentially be used by the new RATs in cases where the new RATs may not have enough available bandwidth when initially deployed.

Currently, when a base station is overloaded and can no longer support the demand for initial bandwidth, the serving base station may force some UEs to handover to other neighboring base stations. The neighboring base stations may be selected based on the capability of a UE to receive the signal from the neighboring cell with an acceptable quality. Neighbor base stations may operate the same RAT or may be of different RATs.

Within current Third Generation Partnership Project (3GPP) specifications, technologies such as Long Term Evolution (LTE) have a backhaul interface that may be defined between neighboring nodes. However in this case, the neighboring nodes belong to the same RAT. There is no backhaul interface currently defined in 3GPP for neighboring nodes of different RATs.

BRIEF DESCRIPTION OF THE DRAWINGS

The present disclosure will be better understood with reference to the drawings, in which.

DETAILED DESCRIPTION OF THE DRAWINGS

Figure 1:
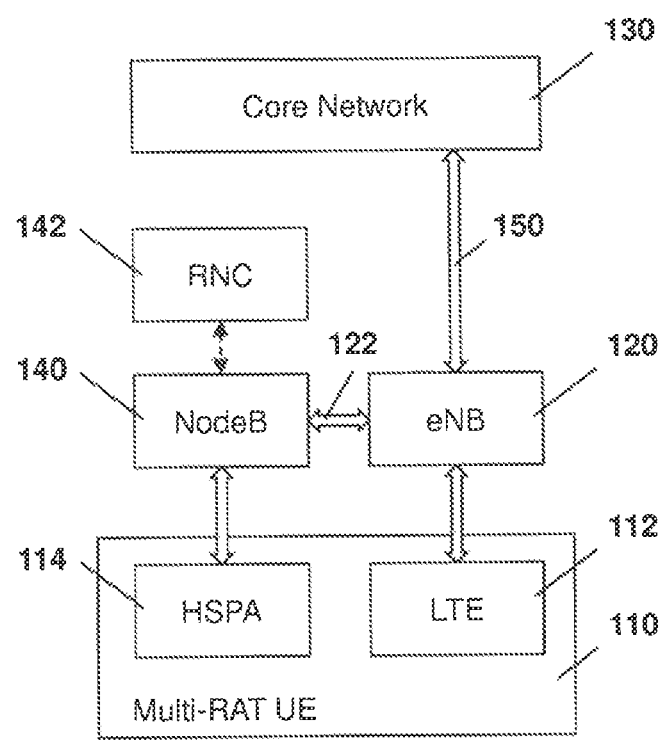
FIG. 1 is a block diagram illustrating one example architecture for carrier aggregation at a multi-RAT user equipment.

The present disclosure provides a method for mobility management in a mobile network having a first radio access technology node and a second radio access technology node, the first radio access technology node and the second radio access technology node communicating over a backhaul interface, the method comprising: detecting, by the first radio access technology node, that a handover for a user equipment to a new node is required; providing, by the first radio access technology node, handover information to the second radio access technology node over the backhaul interface; and performing, by the first radio access technology node, the handover of the user equipment to the new node.

In one embodiment, the first radio access technology node routes the data packets to the second radio access technology node during the handover of the first radio access technology node. In one embodiment the performing the handover comprises: sending a handover request message, which includes context information of the user equipment, to the new node; sending a handover command to the user equipment; forwarding data to the new node; receiving a handover complete message from the new node; and detaching the backhaul interface with the second radio access technology node.

In one embodiment the new node establishes a backhaul interface with the second radio access technology node. In one embodiment the establishing is based on context information received from the first radio access technology node. In one embodiment the second radio access technology node establishes the backhaul interface to the new node on receiving handover information from the first radio access technology node.

In one embodiment the new node is of the same radio access technology as the first radio access technology node. In one embodiment the first radio access technology node includes an interface to a core network for the user equipment. In one embodiment the second radio access technology node includes a tunnel to a core network for the user equipment. In one embodiment the performing the handover does not change the tunnel to the core network.

In one embodiment, the method includes after performing the handover: detecting, at the new node, that a handover from the second radio access technology node is required; establishing, between the new node and a target second radio access technology node, a backhaul interface; and providing, from the new node to the user equipment, information for synchronization with the target second radio access technology node.

In one embodiment, the establishing includes determining whether the target second radio access technology node can support the user equipment. In one embodiment, the determining includes receiving capability information from a measurement report from the user equipment of whether the target second radio access technology node supports multi-radio access technology carrier aggregation. In one embodiment the determining includes receiving capacity information for the target second radio access technology node over the backhaul interface. In one embodiment the target second radio access technology node does not establish a tunnel with a core network.

The present disclosure further provides a first radio access technology node configured for mobility management in a mobile network having the first radio access technology node and a second radio access technology node, the first radio access technology node and the second radio access technology node communicating over a backhaul interface, the first radio access technology node comprising: a processor; and a communications subsystem, wherein the processor and communications subsystem are configured to: detect that a handover for a user equipment to a new node is required; provide handover information to the second radio access technology node over the backhaul interface; and perform the handover of the user equipment to the new node.

In one embodiment, the processor and communications subsystem are further configured to route the data packets to the second radio access technology node during the handover of the first radio access technology node. In one embodiment the processor and communications subsystem are further configured to perform the handover by: sending a handover request message, which includes context information of the user equipment, to the new node; sending a handover command to the user equipment; forwarding data to the new node; receiving a handover complete message from the new node; and detaching the backhaul interface with the second radio access technology node.

In one embodiment the new node establishes a backhaul interface with the second radio access technology node. In one embodiment the establishing is based on context information received from the first radio access technology node. In one embodiment, the second radio access technology node establishes the backhaul interface to the new node on receiving handover information from the first radio access technology node. In one embodiment the new node is of the same radio access technology as the first radio access technology node.

In one embodiment the first radio access technology node includes an interface to a core network for the user equipment. In one embodiment, the second radio access technology node includes a tunnel to a core network for the user equipment. In one embodiment the performing the handover does not change the tunnel to the core network.

The present disclosure further provides a method for mobility management in a mobile network having a first radio access technology node and a second radio access technology node, the first radio access technology node and the second radio access technology node communicating over a backhaul interface, the method comprising: detecting, by the first radio access technology node, that a handover for a user equipment is required; providing, by the first radio access technology node, a handover request to the second radio access technology node over the backhaul interface; and sending, by the first radio access technology node, a handover command to the user equipment.

In one embodiment the method further comprises: receiving an end marker from a serving gateway; forwarding the end marker to the second radio access technology node; and detaching the backhaul interface between the first radio access technology node and the second radio access technology node, wherein the second radio access technology node performs a path switch with the serving gateway after receiving the handover request. In one embodiment the method further comprises receiving a UE context release message from the second radio access technology node.

The present disclosure further provides a first radio access technology node configured for mobility management in a mobile network having the first radio access technology node and a second radio access technology node, the first radio access technology node and the second radio access technology node communicating over a backhaul interface, the first radio access technology node comprising: a processor; and a communications subsystem, wherein the processor and communications subsystem are configured to: detect, at the first radio access technology node, that a handover for a user equipment is required; provide, from the first radio access technology node, a handover request to the second radio access technology node over the backhaul interface; and send a handover command to the user equipment from the first radio access technology node.

In one embodiment the processor and communications subsystem are further configured to: receive an end marker from a serving gateway; forward the end marker to the second radio access technology node; and detach the backhaul interface between the first radio access technology node and the second radio access technology node, wherein the second radio access technology node performs a path switch with the serving gateway after receiving the handover request. In one embodiment the processor and communications subsystem are further configured to receive a UE context release message from the second radio access technology node.

The present disclosure further provides a method for establishing carrier aggregation between a first node having a first radio access technology and a second node having a second radio access technology, the method comprising: determining, by the first node, that a user equipment is capable of multi-radio access technology carrier aggregation; determining, by the first node, that the second node is available for the user equipment; establishing, by the first node, a backhaul interface with the second node; forwarding, by the first node, data regarding the user equipment to the second node; and forwarding, by the first node, a connection request to the user equipment to connect to the second node.

In one embodiment the method further comprises detecting that a ratio of needed bandwidth to available radio resources exceeds a threshold. In one embodiment the determining that the second node is available comprises: requesting a measurement report from the user equipment; and receiving the measurement report. In one embodiment the connection request includes connection information for the second node.

In one embodiment the connection information includes a random access preamble. In one embodiment the connection information includes synchronization information for the second node. In one embodiment, once the user equipment is connected to the second node, identical data is transmitted simultaneously to both the first node and the second node. In one embodiment, once the user equipment is connected to the second node, different data is transmitted to each of the first node and the second node during a transmission time interval.

In one embodiment the first node further sends an indication to the user equipment indicating whether communication with the second node is symmetrical. In one embodiment the first node and the second node are time synchronized.

The present disclosure further provides a first node having a first radio access technology configured for carrier aggregation with a second node having a second radio access technology, the first node comprising: a processor; and a communications subsystem, wherein the processor and communications subsystem are configured to: determine that a user equipment is capable of multi-radio access technology carrier aggregation; determine that the second node is available for the user equipment; establish a backhaul interface between the first node and the second node; forward data regarding the user equipment to the second node; and forward a connection request to the user equipment to connect to the second node.

In one embodiment the processor and communications subsystem are further configured to detect that a ratio of needed bandwidth to available radio resources exceeds a threshold. In one embodiment the processor and communications subsystem are configured to determine that the second node is available by: requesting a measurement report from the user equipment; and receiving the measurement report. In one embodiment the connection request includes connection information for the second node.

In one embodiment the connection information includes a random access preamble. In one embodiment the connection information includes synchronization information for the second node. In one embodiment, once the user equipment is connected to the second node, identical data is transmitted simultaneously to both the first node and the second node. In one embodiment, once the user equipment is connected to the second node, different data is transmitted to each of the first node and the second node during a transmission time interval.

In one embodiment, the processor and communications subsystem are further configured to send an indication to the user equipment indicating whether communication with the second node is symmetrical. In one embodiment the first node and the second node are time synchronized.

The present disclosure further provides a method at a user equipment operating in a mobile network having a first node with a first radio access technology and a second node with a second radio access technology, the method comprising: receiving, from the first node a request to perform an inter-radio access technology neighbor cell measurement; performing the inter-radio access technology neighbor cell measurement; and providing a report to the first network node, the report including an indication of whether a neighbor cell supports inter-radio access technology carrier aggregation.

In one embodiment the indication is a single bit. In one embodiment, the method further comprises receiving a request to connect to the second node. In one embodiment the request includes information to assist the user equipment to connect to the second node. In one embodiment the information includes a random access preamble to be used by the user equipment for the connection. In one embodiment the information includes synchronization information for the second node. In one embodiment the method further comprises establishing a connection with the second node, the establishing including sending a user equipment identifier for the user equipment on the first node to the second node.

The present disclosure further provides a user equipment operating in a mobile network having a first node with a first radio access technology and a second node with a second radio access technology, the user equipment comprising: a processor; and a communications subsystem, wherein the processor and communications subsystem are configured to: receive, from the first node a request to perform an inter-radio access technology neighbor cell measurement; perform the inter-radio access technology neighbor cell measurement; and provide a report to the first network node, the report including an indication of whether a neighbor cell supports inter-radio access technology carrier aggregation.

In one embodiment the indication is a single bit. In one embodiment the processor and communications subsystem are further configured to receive a request to connect to the second node. In one embodiment the request includes information to assist the user equipment to connect to the second node. In one embodiment the information includes a random access preamble to be used by the user equipment for the connection. In one embodiment the information includes synchronization information for the second node. In one embodiment the processor and communications subsystem are further configured to establish a connection with the second node, the establishing including sending a user equipment identifier for the user equipment on the first node to the second node.

The present disclosure further provides a method at a first node of a first radio access technology for communicating data received from a second node having a second radio access technology to a user equipment, the method comprising: receiving the data, the data being a protocol layer packet of the second radio access technology; adding a sequence number to the protocol layer packet; adding a multi-radio access technology header to the protocol layer packet; and forwarding the packet to the user equipment.

In one embodiment the adding the multi-radio access technology header skips other protocol layer functionality for a protocol layer. In one embodiment the protocol layer packet is a packet data convergence protocol layer packet. In one embodiment the method further comprises adding a protocol layer header after the adding the multi-radio access technology header. In one embodiment the receiving is over a multi-radio access technology backhaul interface.

The present disclosure further provides a first node of a first radio access technology for communicating data received from a second node having a second radio access technology to a user equipment, the first node comprising: a processor; and a communications subsystem, wherein the processor and communications subsystem are configured to: receive the data, the data being a protocol layer packet of the second radio access technology; add a sequence number to the protocol layer packet; add a multi-radio access technology header to the protocol layer packet; and forward the packet to the user equipment.

In one embodiment the processor and communications subsystem are further configured skip other protocol layer functionality for a protocol layer. In one embodiment the protocol layer packet is a packet data convergence protocol layer packet. In one embodiment the processor and communications subsystem are further configured to add a protocol layer header after the adding the multi-radio access technology header. In one embodiment the processor and communications subsystem are configured to receive is over a multi-radio access technology backhaul interface.

The present disclosure further provides a method at a user equipment communicating with both a first node having a first radio access technology and a second node having a second radio access technology, the second node having a tunnel to a core network, the method comprising: receiving a protocol layer packet from the first node at the user equipment; and at a first radio access technology protocol layer corresponding to the protocol layer packet: removing a multi-radio access technology header; ordering the packet; and forwarding the packet to a second radio access technology protocol layer corresponding to the first radio access technology protocol layer.

In one embodiment, the first radio access technology protocol layer is a packet data convergence protocol (PDCP) layer. In one embodiment the removing the multi-radio access technology header further comprising skipping other PDCP layer functionality. In one embodiment the method further comprises removing a PDCP header before removing the multi-radio access technology header.

In one embodiment the first radio access technology protocol layer is a radio link control (RLC) layer. In one embodiment, the method further comprises receiving an RLC protocol data unit (PDU) segment size for a transmission opportunity. In one embodiment the removing the multi-radio access technology header further comprising skipping other RLC layer functionality.

In one embodiment the first radio access technology protocol layer is a medium access control (MAC) layer. In one embodiment, after the removing the multi-radio access technology header, the packet is treated as a MAC service data unit. In one embodiment the method further comprises receiving an MAC protocol data unit (PDU) segment size for a transmission opportunity.

In one embodiment the first radio access technology protocol layer is an internet protocol (IP) layer. In one embodiment a further multi-radio access technology protocol layer is used to handle radio access technology selection.

In one embodiment the first radio access technology protocol layer is a multi-radio access technology protocol layer. In one embodiment the method further comprises combining identical packets received from the first node and the second node.

The present disclosure further provides a user equipment communicating with both a first node having a first radio access technology and a second node having a second radio access technology, the second node having a tunnel to a core network, the user equipment comprising: a processor; and a communications subsystem; wherein the processor and communications subsystem are configured to: receive a protocol layer packet from the first node at the user equipment; and at a first radio access technology protocol layer corresponding to the protocol layer packet: remove a multi-radio access technology header; order the packet; and forward the packet to a second radio access technology protocol layer corresponding to the first radio access technology protocol layer.

In one embodiment the first radio access technology protocol layer is a packet data convergence protocol (PDCP) layer. In one embodiment removing the multi-radio access technology header further comprises skipping other PDCP layer functionality. In one embodiment the processor and communications subsystem are further configured to remove a PDCP header before removing the multi-radio access technology header.

In one embodiment the first radio access technology protocol layer is a radio link control (RLC) layer. In one embodiment the processor and communications subsystem are further configured to receive an RLC protocol data unit (PDU) segment size for a transmission opportunity. In one embodiment the removing the multi-radio access technology header further comprises skipping other RLC layer functionality.

In one embodiment the first radio access technology protocol layer is a medium access control (MAC) layer. In one embodiment, after the removing the multi-radio access technology header, the packet is treated as a MAC service data unit. In one embodiment the processor and communications subsystem are further configured to receive a MAC protocol data unit (PDU) segment size for a transmission opportunity.

In one embodiment the first radio access technology protocol layer is an internet protocol (IP) layer. In one embodiment a further multi-radio access technology protocol layer is used to handle radio access technology selection.

In one embodiment the first radio access technology protocol layer is a multi-radio access technology protocol layer. In one embodiment the processor and communications subsystem are further configured to combine identical packets received from the first node and the second node.

In order to allow UE to simultaneously transmit and receive packets from multiple RATs, the present disclosure provides for a new multi-RAT backhaul interface. The new backhaul may be used to divert packets to another node that is operating in a different RAT than the serving node. The multi-RAT backhaul may be used to enable multi-RAT carrier aggregation (CA).

Carrier aggregation allows the expansion of effective bandwidth delivered to a mobile device through concurrent utilization of radio resources across multiple frequency carriers. The multiple carriers are then aggregated to form a larger overall transmission bandwidth. In 3GPP High Speed Packet Access (HSPA), carrier aggregation was introduced in Release 8. Currently, up to 8 high speed downlink packet access (HSDPA) carriers may be aggregated in Release 11.

Similarly, in 3GPP Long Term Evolution, carrier aggregation for up to 5 LTE carriers has been introduced in Release 10. Also, downlink dual band operation was introduced in Release 9 for HSPA dual carrier operation and for LTE carrier aggregation in Release 10.

Since most operators need to operate both HSPA and LTE technologies in parallel and there is limited spectrum available, the potential exists for a HSPA and/or LTE carrier aggregation which may not be fully exploited. Further, the re-farming of existing spectrum using HSPA for LTE may lower the data rates to HSPA-only users. Since HSPA data coverage may be maintained for use by existing HSPA devices, migrating the HSPA spectrum to LTE may not be possible. The aggregation of LTE and HSPA carriers allows the HSPA capacity to be made available to the LTE devices, while serving the existing HSPA devices.

While the present disclosure discusses HSPA and LTE carrier aggregation, the present disclosure is not limited to those two RATs. In particular, any two RATs may be combined in accordance with the embodiments of the present disclosure. Examples of other RATs include Wi-Fi, Wi-MAX, second generation technologies, third generation technologies, among others. The use of any two RATs having a wired backhaul link and communication channels with each other may allow for the benefits of the present disclosure to be achieved.

The aggregation of HSDPA with LTE Downlink carriers for multi-RAT capable devices may improve spectrum utilization, provide dynamic load balancing between the two technologies to handle the short term load variations that result from bursty data traffic, provide a combined peak data rate and improve cell edge user data rates and average user data rates.

For example, an operator that has 15 MHz available for both LTE and HSPA may, using multi-RAT carrier aggregation, be able to offer aggregated peak data rates of the two systems rather than the peak data rate of only one of the systems. Although, a higher peak rate may be offered if both bands were operating the same RAT, this may not be possible since legacy and new UEs must both be served.

As indicated above, in wireless standards such as 3GPP LTE and WiMAX, multiple carriers of the same RAT may be aggregated to both the uplink (UL) and the downlink (DL). By introducing a multi-RAT backhaul interface between different RATs, multi-RAT carrier aggregation may be enabled between different RATs at different access points or base stations (BS). In multi-RAT carrier aggregation (CA), carriers are used by different nodes from different networks and may be operating using different RATs may be allocated to the UE for one or both of downlink or uplink transmission. In this case, a UE may be able to transmit or receive one or more service flows on multiple RATs in order to improve its quality of service (QoS). If the evolved NodeB (eNB) detects that the available bandwidth is not sufficient to provide all services required by a UE, then the eNB may configure a multi-RAT backhaul to a neighboring node that is operating a different RAT to enable multi-RAT carrier aggregation. The serving eNB of the UE may make this decision based on a UE's capability to handle multi-RAT carrier aggregation and the available resources at the other RAT.

The multi-RAT backhaul interface may be at the medium access control (MAC) layer, the radio link control (RLC) layer, the packet data convergence protocol (PDCP) layer or at the internet protocol (IP) layer. In each case, a RAT selection procedure is provided below which determines the best RAT on which to send the packets.

Reference is now made to FIG. 1. In multi-RAT carrier aggregation, one RAT may be the primary RAT, which is used for initial access. For example, a multi-RAT capable user equipment (UE) may perform initial access on an LTE network. The LTE eNB may then instruct the UE to establish a connection to an HSPA NodeB. In this case, data can be forwarded by the LTE eNB to the HSPA NodeB or radio network control (RNC) rather than establishing another path from the core network to the NodeB.

In particular, in FIG. 1, a multi-RAT UE 110 has a communications subsystem 112 capable of supporting LTE, as well as a communications subsystem 114 capable of supporting HSPA.

Initially, UE 110 is connected through eNB 120 over the LTE communication subsystem 112 to a core network 130. The eNB 120 then decides that multi-RAT carrier aggregation would be beneficial and uses a backhaul communication 122 to communicate with a NodeB 140 of an HSPA network.

RNC 142 communicates with NodeB 140, as shown in FIG. 1.

NodeB 140 and UE 110 then establish communication over the HSPA communication subsystem 114.

However, as seen in FIG. 1, only a single connection 150 exists between core network 130 and eNB 120. Thus, communications that are directed through the HSPA network and in particular through NodeB 140 are then directed over the backhaul interface 122 to eNB 120 before being forwarded to core network 130. This may be accomplished, as described in more detailed below, by encapsulating packets with a multi-RAT header and then removing the multi-RAT header at the eNB prior to forwarding the data packet to a core network.

As used herein, a primary RAT is defined as the RAT that has the connection to the core network and the secondary RAT is defined as the RAT that communicates through the primary RAT in order to communicate with the core network 130.

The network node on the secondary RAT may be co-located with the network node of the primary RAT or it may be at a different site in accordance with various embodiments of the present disclosure.

The use of a multi-RAT interface transmission procedure provides for mobility management, load management, sharing management and configuration updates and setup.

In particular, for mobility management, the multi-RAT interface provides user data and control signals transferred between multi-RAT networks. Mobility management allows for the primary RAT to move responsibility of a certain UE to a secondary RAT and it also allows a secondary RAT to move responsibility of a certain UE to the primary RAT.

With regard to load management, the load management function indicates resource status, overload and traffic load on multi-RAT interfaces. A sharing request may be sent from the primary or secondary RAT to the secondary or primary RAT to control the load balancing of the primary or secondary RAT when heavily loaded. The request is sent to quickly resolve loading problems using multi-RAT interfaces.

With regard to sharing management, a sharing management function provides for error recovery procedures to recover from irregular, uncertain or incorrect operation on a multi-RAT interface. The sharing management also allows for resetting of the link by booting-up from initialization or by resetting all of the functions.

With regard to configuration updates and setup, configuration update and setup functionality provides any update of the link on a multi-RAT interface.

The above four functions are shown below with regard to Table 1.

TABLE 1

Major functions and operations for a multi-RAT interface

| Main Functions | Sub-operation |
| --- | --- |
| Mobility Management | Handover |
|  | Status information |
|  | UE context release |
| Load Management | Load indication |
|  | Load sharing |
|  | Resource status |
| Sharing Management | Error reporting |
|  | System reset |
| Configuration update and setup | Multi-RAT link setup |
|  | Update |

As seen in Table 1, the main functions include sub-operations. Thus, mobility management includes handovers, status information and UE context release. Load management includes load indication and load sharing and resource status. Sharing management includes error reporting and system resets. Configuration updates and setups includes multi-RAT link setups and updates.

Each of the sub-operations of Table 1 above are shown in more detail below with regard to Table 2.

TABLE 2

Contents and procedures for sub-operations

| Sub-operation | Behaviour |
| --- | --- |
| Handover | Resource preparation and link establishment for expected handover operation. (e.g. handover request, handover response, handover cancel, handover failure etc.) |
| Status Information | Transfer of status of UL/DL PDCP SN (Sequence number) and HFN (Hyper Frame Number) receiver status |
| UE Context Release | Release of radio and control plane resources and profile for the handed over UE |
| Load Indication | Exchange of Load information of neighbour RATs |
| Load Sharing | A certain RAT requests the sharing to another RAT system to balance its load status |
| Resource Status | Neighbour RATs request the reporting of the load measurement and available resources for handover and similar operation |
| Error Reporting | Neighbour RATs transmit the indication to each other when an error occurred |

TABLE 2-continued

Contents and procedures for sub-operations

| Sub-operation | Behaviour |
|---|---|
| System Reset | When a malfunction occurs or the system is down, a system reset procedure will be automatically or manually initiated |
| Multi-RAT Link Setup | After resetting of the link, Multi-RAT link will be setup again |
| Update | If there are any updates due to changing of the environment or network configuration, updates among neighbor RATs will be performed |

As seen from Table 2 above, the sub-operations include various behaviors. For example, handover has the behavior of resource preparation and link establishment for expected handover operations, and may include the handover request, handover response, handover cancel, handover failure, among others.

The behaviors of Table 2 may be facilitated utilizing various messages. Reference is now made to Table 3, which shows various messages used to initiate some actions and related responses for the operations. The naming of the messages is meant as an example only and may, in implementation, be different. However, the purpose of the message would be for use by multi-RAT networks.

TABLE 3

Messages for a multi-RAT interface

| Sub-operation | Messages |
|---|---|
| Handover | HANDOVER REQUEST |
| | HANDOVER RESPONSE (SUCCESS and FAIL) |
| | HANDOVER CANCEL |
| Status Information | STATUS REQUEST |
| | STATUS RESPONSE |
| UE Context | CONTEXT REQUEST |
| | CONTEXT RESPONSE |
| | CONTEXT RELEASE |
| Load Indication | LOAD INFORMATION REQUEST |
| | LOAD INFORMATION RESPONSE |
| Load Sharing | LOAD SHARE REQUEST |
| | LOAD SHARE RESPONSE (SUCCESS and FAIL) |
| Resource Status | RESOURCE STATUS REQUEST |
| | RESOURCE STATUS RESPONSE |
| Error Reporting | ERROR INDICATION |
| System Reset | SYSTEM RESET REQUEST |
| | SYSTEM RESET RESPONSE (SUCCESS and FAIL) |
| Multi-RAT link setup | LINK SETUP REQUEST |
| | LINK SETUP RESPONSE (SUCCESS and FAIL) |
| Update | UPDATE REQUEST |

Thus, in accordance with Table 3, a handover may include a handover request, a handover response which indicates success or failure, or a handover cancel message, for example.

Figure 2:
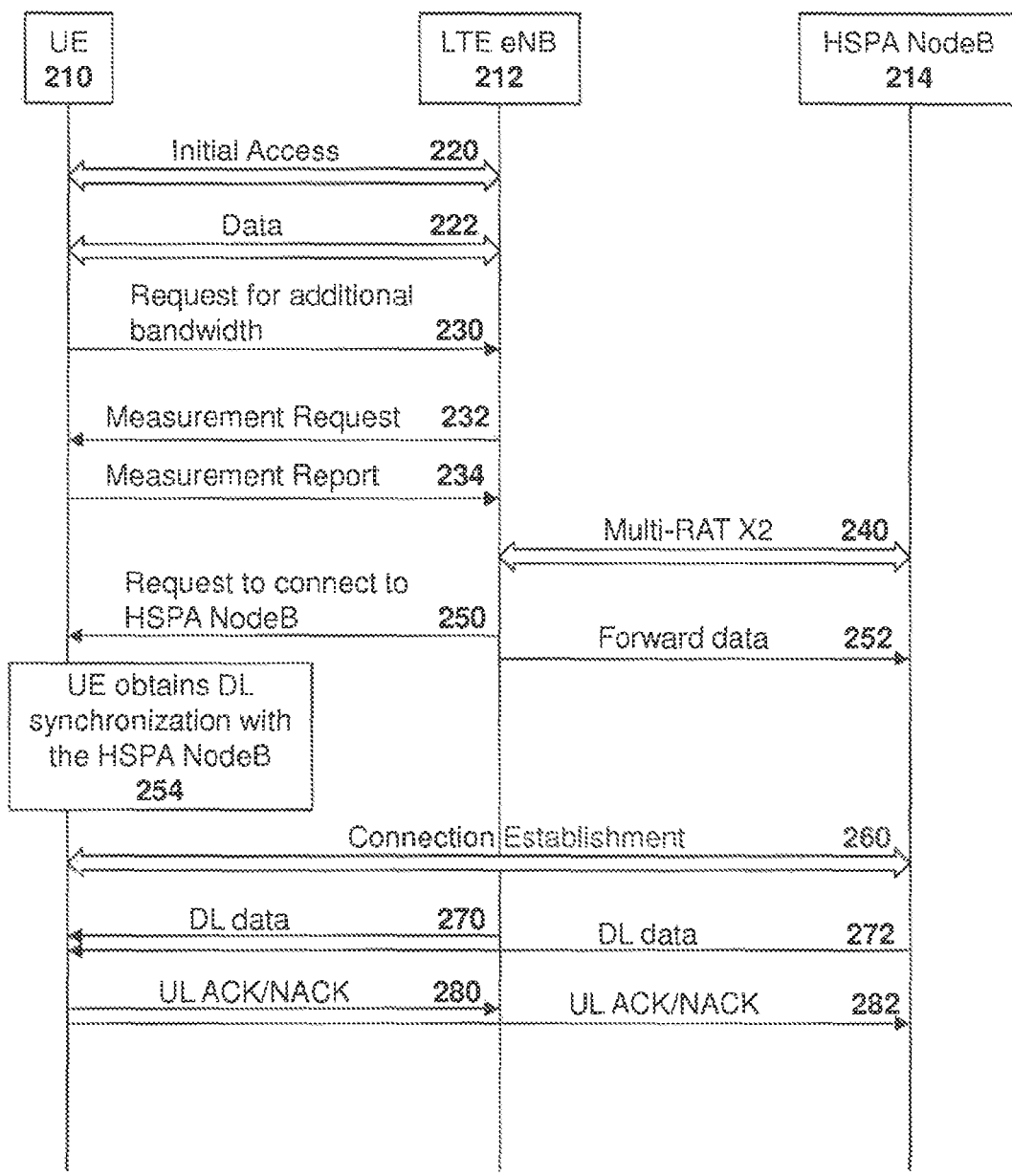
FIG. 2 is a flow diagram illustrating the establishment of a connection between a plurality of RATs and a UE.

Reference is now made to FIG. 2, which illustrates a multi-RAT procedure in which an LTE is the primary RAT and HSPA is the secondary RAT. However this is not limiting and is only meant as an example.

In particular, UE 210 communicates with an LTE eNB 212 as well as an HSPA NodeB 214. At arrow 220, UE 210 performs initial access on the LTE carrier and establishes a data service on the downlink and/or the uplink. The UE indicates in the message of arrow 220 that it is capable of multi-RAT carrier aggregation when a radio resource control (RRC) connection is established.

The data connection is established and is shown by arrow 222.

At some point, the serving eNB 212 detects that the ratio of the sum of required bandwidth to the available radio resources becomes higher than a predetermined threshold. This may be a result of downlink traffic for UE 210 or may be as a result of a message such as that shown by arrow 230 requesting additional bandwidth between UE 210 and LTE eNB 212. The serving eNB 212 may then request an inter-RAT neighbor cell measurement report from UEs who are capable of multi-RAT carrier aggregation. The measurement request is sent to UEs, including UE 210, as shown by arrow 232.

In response to receiving a measurement request at arrow 232, UE 210 then sends a measurement report, as shown by arrow 234, back to LTE eNB 212. The measurement report at arrow 234 may contain an indicator if the measured node is capable of multi-RAT carrier aggregation.

From the reported measurements, eNB 212 can decide to communicate with a neighbor network node such as HSPA NodeB 214 for assistance if the UE is determined to have acceptable reception with respect to that node. An X2-like interface may be established between the eNB and the NodeB/RNC, as shown by arrow 240.

If the NodeB 214 has enough bandwidth, it may acknowledge the eNB request. The NodeB may indicate available bandwidth if it does not have full bandwidth available as requested by the eNB. Thus, communications are bi-directional, as shown by arrow 240.

Based on availability of the network neighboring node, eNB 212 may instruct UE 210 to establish communication with the neighboring node, as shown by arrow 250. The message at arrow 250 may include information to the UE to allow transmission to be enabled on the NodeB and can, for example, include downlink synchronization with HSPA NodeB 214, shown by block 254

Further, LTE eNB 212 may forward data related to UE 210 to HSPA NodeB 214, as shown by arrow 252.

UE 210 may send an acknowledgement to eNB 212 and initiate a connection to NodeB 214 to enable the service. Connection establishment is shown by arrow 260 and may be a simplified connection establishment procedure since certain connection parameters do not need to be established. For example, encryption keys to communicate with a core network do not need to be exchanged for connection establishment to a secondary RAT in some embodiments. Further, the request shown by arrow 250 may include information such as dedicated preambles for random access channel (RACH) establishment to simplify connection establishment and remove contention based connection establishment.

Subsequently, downlink data may be received at UE 210 from one or both of eNB 212 or NodeB 214, as shown by arrows 270 and 272. Further, uplink acknowledgements or negative acknowledgements may be provided, as shown by arrows 280 and 282 between the UE and the eNB 212 and NodeB 214 respectively.

For uplink transmission, the UE may send the uplink request to one of the RATS or both. If provided with an uplink grant on both RATs, the UE may send either the same packet to improve error rates and packet delay, or different packets to improve throughput, dependent on the implementation requirements.

In another embodiment, the multi-RAT transmission procedure may be used by mobile relay nodes to send and/or receive packets on the relay backhaul. In this case, multiple radio bearers for different UEs can be offloaded onto a secondary RAT as needed. The mobile relay node behaves similarly to a UE in the multi-RAT transmission procedure.

In one embodiment, transmission over different RATs may allow identical data to be transmitted simultaneously to facilitate handover. In particular, the simultaneous transmission may be used to enable a 'make before break' handover which may prevent inter-RAT handover failures that can occur quite often, especially in the small cells or hotspots within heterogeneous network environments. This may be from either handing over too early, for example from a universal mobile terrestrial service (UMTS) to a small cell LTE, or a "hand over too late", for example from a small LTE to a UMTS.

An additional bit may be used to indicate simultaneous identical (duplicate) or different data transmissions over different RATs. Thus, the bit may indicate that the data between the two RATs is identical for one value, and conversely if the bit is toggled the bit may indicate that the transmissions are different between the RATs. The bit may be used for both over-the-air interfaces as well as along a backhaul, and can be used to indicate which type of transmission is used.

If the bit is used for PDCP, the bit can be used to select or combine the same packet data control protocol (PDCP) sequence number (SN) before handover.

In establishing the multi-RAT backhaul, the primary RAT may send a request to a secondary RAT to handle a service flow for a specified UE. If the secondary RAT has enough trust in the primary RAT, the authentication that is done by the primary RAT may be accepted by the secondary RAT. The message from the primary RAT includes an identifier for the UE in the request so that the secondary RAT may authenticate the UE when it initiates the connection establishment procedure with the secondary RAT. Multi-RAT backhaul requests may include the amount of resources needed for assisting transmission to the UE.

Further, on receiving a multi-RAT backhaul request for a specified UE from a primary RAT, the secondary RAT may send an acknowledgement message to the primary RAT. This acknowledgement message may include the amount of resources that can be allocated for the specified UE, which may be different than that requested. Other information that may also be included in the acknowledgement message to simplify connection establishment procedures for the UE may also be provided. For example, the response may include the random access preamble to be used by the UE in order to avoid a contention based random access procedure.

On receiving the acknowledgement message from the secondary RAT, the primary RAT may instruct the UE to enable the secondary RAT. This request to the UE may include information sent by the secondary RAT to the primary RAT for assisting the connection establishment procedure, such as the random access preamble and/or the resources to use for random access.

During the connection establishment procedure with the secondary RAT, the UE synchronizes with the secondary RAT network node using a synchronization procedure of the secondary RAT. This procedure may involve sending a random access preamble as instructed by the primary RAT. The UE may be assigned a dedicated random access preamble and dedicated resources to send the preamble. Although this procedure may be similar to the procedure used by the secondary RAT for its own UEs, in a multi-RAT transmission case the UE may also send its user equipment identifier (UE ID) on the primary RAT in order for the secondary RAT to authenticate the UE.

The random access response message may include the timing offsets and the UE ID to be used on the secondary RAT. Other information such as the allocation of dedicated control channels may also be included. If the UE is configured for multi-RAT carrier aggregation on both the downlink and the uplink, then uplink feedback channels for a channel quality indicator (CQI) and acknowledgement or negative acknowledgement (ACK/NACK) feedback may be configured on the secondary RAT.

Alternatively, the UE may send some or all of its signalling message for the secondary RAT over the primary RAT. For example, the UE's buffer status report may be sent to the primary RAT and the information can be provided to the secondary RAT by the primary RAT using a multi-RAT backhaul interface. The UE may also send live feedback and hybrid acknowledgement repeat request (HARQ) ACK/NACK for the secondary RAT on the primary RAT. This may involve the UE saving power by transmitting data on only one RAT at a time, even though it may receive data on both RATs simultaneously. In some embodiments, the UE may be configured to transmit on the both the primary and the second RAT or in other cases on the primary RAT only, based on the UE's capabilities.

In one embodiment, an indication within UE configuration information may include whether or not multi-RAT transmission is symmetrical in the uplink and downlink, or not. If not, the configuration information may include whether the uplink transmissions are sent on the primary or the secondary RAT.

When the UE sends the UL HARQ ACK/NACK for the secondary RAT on the primary RAT, the HARQ protocol of the primary RAT may be used. In this case, the multi-RAT configuration procedure may contain a mapping for multi-carrier HARQ feedback. For example, if a UE is allocated two DL carriers, one for the primary RAT and the other for the secondary RAT, and only one UL carrier on the primary RAT then the HARQ feedback for both RATs may be sent on the UL of the primary RAT. The carrier index for the HARQ feedback will indicate whether or not the HARQ ACK/NACK is forwarded to the secondary RAT over the multi-RAT backhaul interface.

In some embodiments, if the UE does not complete the connection with the secondary RAT within a specified time, the secondary RAT may assign the available resources to other UEs. The specified time may be negotiated, in some embodiments, between the primary and the secondary RAT.

Once the UE successfully connects with the network node of the secondary RAT, data that is forwarded by the primary RAT to the secondary RAT can be sent to the UE on the secondary RAT.

In order to simplify the multi-RAT transmission processes, the primary RAT and the secondary RAT may be time synchronized. The synchronization may be at the transmission time interval (TTI) boundary or at the radio frame boundary. If the UE is configured to only aggregate the multi-RAT carriers on the downlink, then the UE may send ACK/NACK feedback to the primary RAT. In this case, time synchronization between the primary and the secondary RATs may simplify the ACK/NACK feedback process.

Multi-RAT Backhaul

Figure 3:
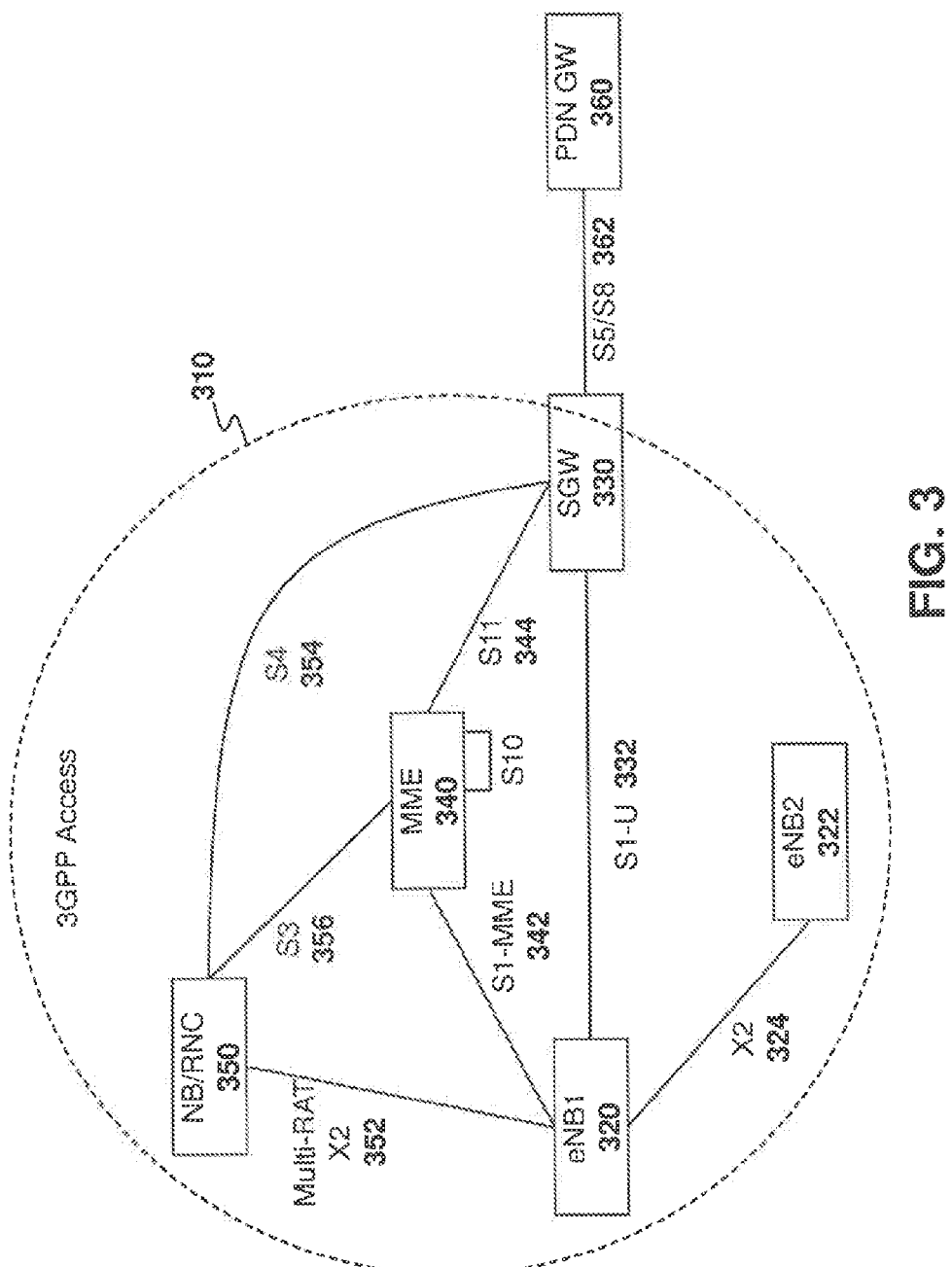
FIG. 3 is an architecture diagram of network nodes and connections for a plurality of radio access technologies.

Reference is now made to FIG. 3, which shows an architectural diagram for a multi-RAT backhaul in accordance with one embodiment of the present disclosure.

In the embodiment of FIG. 3, an exemplary architecture is shown having an LTE network as well as a HSPA network. In particular, in the embodiment of FIG. 3, 3GPP access is shown with regard to reference numeral 310. Within the 3GPP access, a first eNB 320 and a second eNB 322 communicate through an X2 interface 324.

eNB 320 communicates with a serving gateway (SGW) 330 using an S1-U interface 332. Similarly, eNB 322 could also communicate with SGW 330, although this is not shown for simplicity in the embodiment of FIG. 3.

The eNB 320 also communicates with a mobility management entity (MME) 340 over an S1-MME interface 342 and MME 340 communicates with SGW 330 over an S11 interface 344.

In the embodiment of FIG. 3, a NodeB/RNC 350 is the contact point for the HSPA network. In accordance with the embodiment of present disclosure, eNB 320 communicates with either the NodeB or the RNC 350 over a multi-RAT X2 interface 352. The multi-RAT X2 interface 352 is described below in more detail.

The NodeB/RNC 350 communicates with the SGW 330 over an S4 interface 354. NodeB/RNC 350 communicate with the MME 340 through an S3 interface 356.

SGW 330 further communicates with a packet data network gateway 360 over an S5 or S8 interface 362.

The multi-RAT interface 352 is introduced between neighboring universal terrestrial radio access network (UTRAN) and evolved UTRAN (E-UTRAN) nodes. The multi-RAT X2 interface is similar to the X2 interface between neighboring eNBs in E-UTRAN. However, since the NodeB UTRAN terminates at layer 2, multi-RAT X2 interface is between the eNB and the RNC of the NodeB if the multi-RAT X2 interface is at the RLC layer or the PDCP layer. If the interface is at the MAC layer then the backhaul is between the eNB and the NodeB. These protocol layers are shown below with regards to FIGS. 4 and 5.

Figure 4:
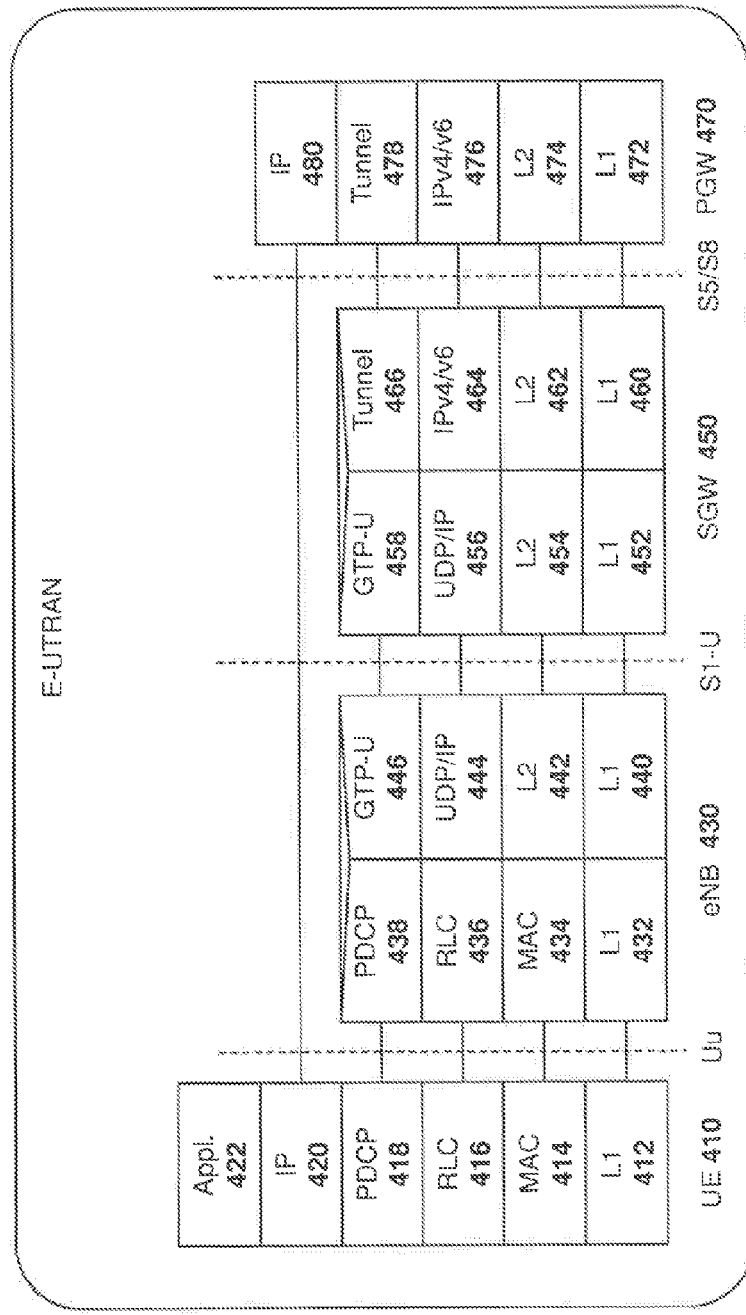
FIG. 4 is a block diagram illustrating a protocol stack for elements within an E-UTRAN network.

Reference is now made to FIG. 4, which shows a protocol stack for an E-UTRAN. In particular, each element within the network has a number of protocols. UE 410 includes a layer 1 (L1) 412, a MAC layer 414, a radio link control (RLC) layer 416, a PDCP layer 418, an internet protocol (IP) layer 420 and an application layer 422.

Typically, communications between elements of the network occur at the same level in the protocol stack. Thus, eNB 430 includes L1 432 for communicating with L1 412, a MAC layer 434 for communicating with MAC layer 414, an RLC layer 436 for communicating with RLC layer 416, and a PDCP layer 438 for communicating with PDCP layer 418 from the UE 410.

The eNB 430 further includes a protocol stack for communication with the software gateway 450 over the S1-U interface. eNB 430 includes an L1 440, a layer 2 (L2) 442, a universal datagram protocol (UDP)/IP layer 444 and a global system for mobile communications (GSM) packet radio service (GPRS) tunneling protocol user plane (GTP-U) layer 446.

Similarly SGW 450 includes an L1 452 for communicating with L1 440 of eNB 430. SGW 450 further includes an L2 454, a UDP/IP layer 456 and a GTP-U layer 458.

SGW 450 further includes a protocol stack for communicating over the S5/S8 interface with the packet data network gateway (PGW) 470. In particular, SGW 450 includes an L1 layer 460, an L2 layer 462, an IP version 4/version 6 (IPv4/v6) layer 464 and a tunnel layer 466.

PGW 470 includes an L1 472 for communicating with L1 460. PGW 470 further includes an L2 474, an IPv4/v6 layer 476, and a tunnel layer 478.

PGW 470 further includes an IP layer 480 which is used for communication with IP layer 420 of UE 410.

Thus FIG. 4 shows the protocol stack for an E-UTRAN.

Figure 5:
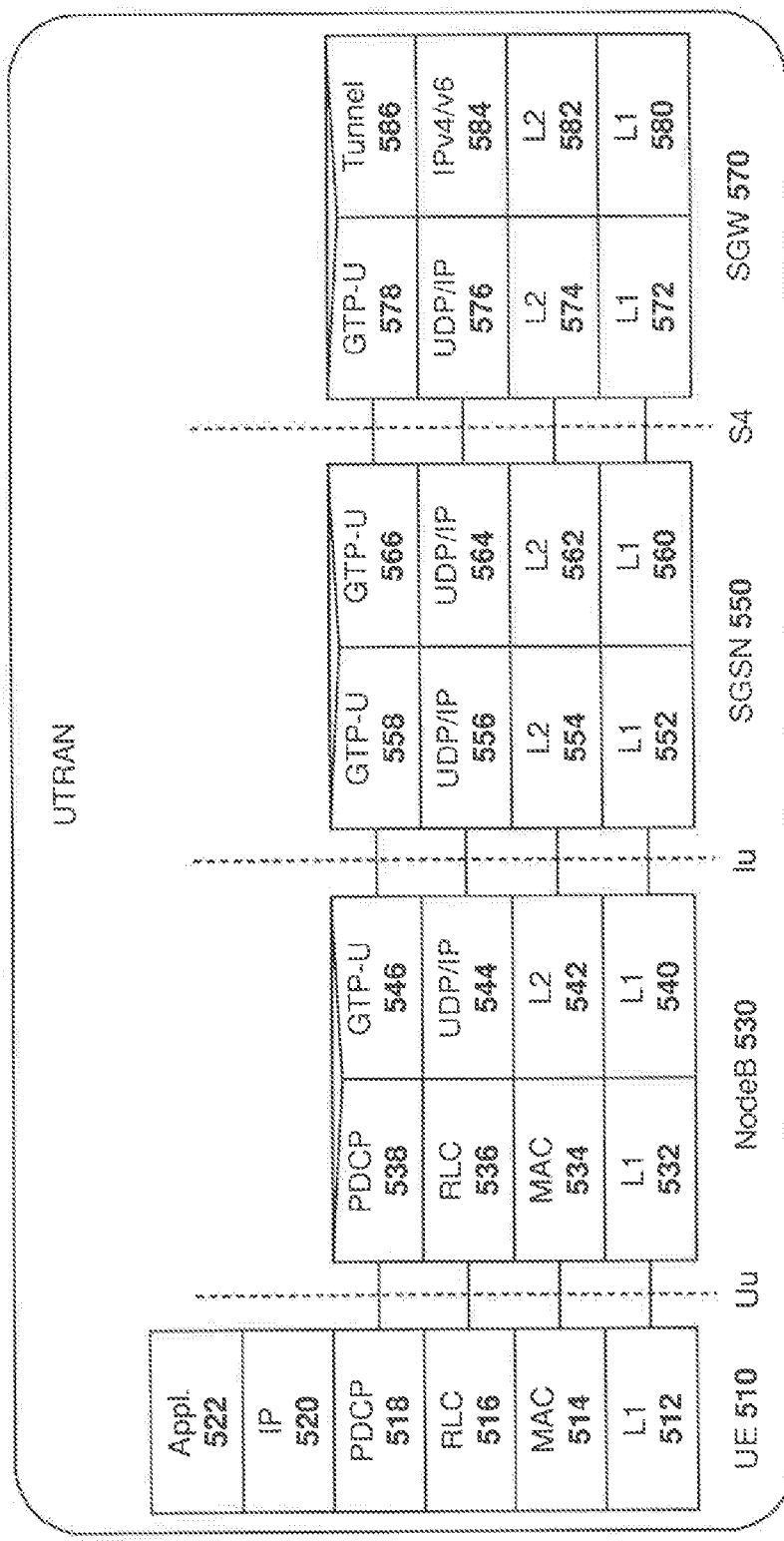
FIG. 5 is a block diagram illustrating a protocol stack for elements within an UTRAN network.

Reference is now made to FIG. 5, which shows a protocol stack for a UTRAN. In particular UE 510 includes an L1 512, MAC layer 514, RLC layer 516, PDCP layer 518, IP layer 520 and an application layer 522.

Similarly, NodeB 530 includes an L1 532, a MAC layer 534, an RLC layer 536 and PDCP layer 538, all of which are meant to communicate with UE 510.

NodeB 530 further includes an L1 540, an L2 542, a UDP/IP layer 544 and a GTP-U layer 546, which are meant to communicate with a serving GPRS support node (SGSN) 550. In particular, SGSN 550 includes an L1 552, an L2 554, a UDP/IP layer 556 and a GTP-U layer 558 for communication with NodeB 530.

Similarly, SGSN 550 includes an L1 560, an L2 562, a UDP/IP layer 564 and a GTP-U layer 566, all of which for communicating with the SGW 570.

SGW 570 includes an L1 572, an L2 574, a UDP/IP layer 576 and a GTP/U layer 578.

Similarly, SGW 570 includes an L1 580, an L2 582, an IPv4/v6, layer 584 and a tunnel layer 586, which are meant to communicate with further network elements in the system.

From FIGS. 4 and 5 above, since the protocol stack at the serving gateway is the same for both the E-UTRAN and UTRAN and since the GTP-U protocol is common to both RATs, the same protocol stack can be used for the multi-RAT X2 backhaul interface. This allows the same backhaul interface to be used between different RATs (HSPA and LTE) as in the case of the same RAT (X2 interface between eNBs).

Figure 6:
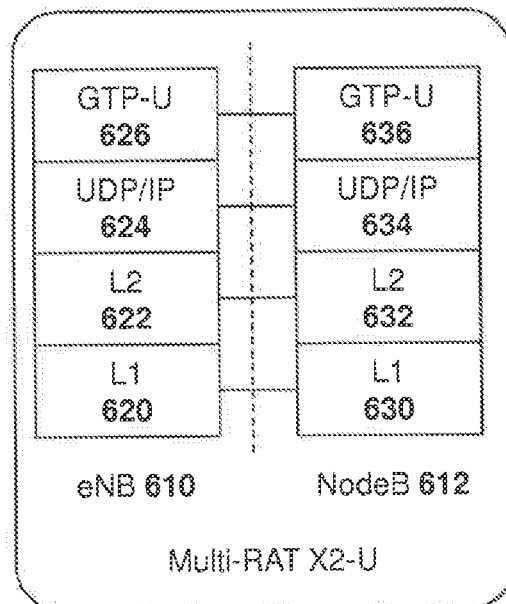
FIG. 6 is a protocol stack for a user plane for a backhaul interface between a first radio access technology node and a second radio access technology node.

Reference is now made to FIG. 6, which shows a protocol stack for the control plane in accordance with one embodiment of the present disclosure.

In accordance with FIG. 6, a multi-RAT X2-U interface 610 and a NodeB 612 utilizes four layers. In particular, eNB 610 has an L1 620, an L2 622, a UDP-IP layer 624 and a GTP-U layer 626.

Similarly, NodeB 612 includes an L1 630, an L2 632, UDP-IP layer 634 and a GTP-U layer 636.

Figure 7:
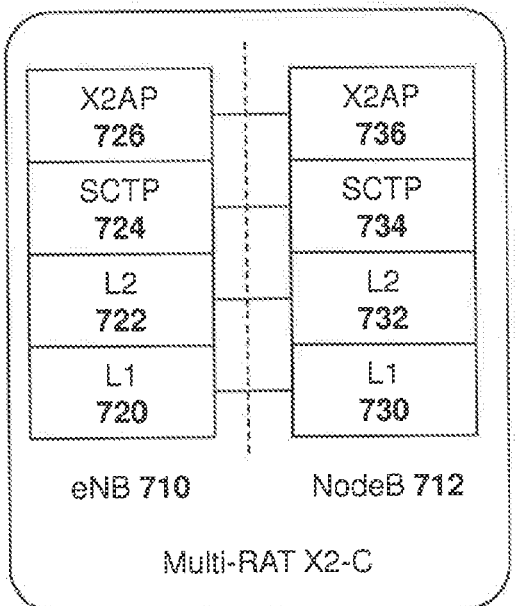
FIG. 7 is a protocol stack for a control plane for a backhaul interface between a first radio access technology node and a second radio access technology node.

With regard to the user plane, reference is now made to FIG. 7. In FIG. 7, eNB 710 communicates with NodeB 712. eNB 710 includes L1 720, L2 722, a stream control transmission protocol (SCTP) layer 724 and an X2 application protocol (X2AP) layer 726.

Similarly, NodeB 712 includes a L1 730, L2 732, SCTP layer 734 and an X2AP layer 736.

In accordance with the above, when a multi-RAT transmission is enabled, a GTP tunnel is only established on the primary RAT. Since the multi-RAT transmission is transparent to the core network, no GTP tunnel is established on the secondary RAT. All packets to or from the core network are sent to or from the node on the primary RAT. As used herein, the GTP tunnel is also referred to as an interface between the core network and the primary RAT, and the interface includes both the control plane and user plane.

On the radio access side, however, the UE receives packet on the primary RAT as well as packets that have been forwarded to the secondary RAT by the primary RAT through the multi-RAT backhaul.

Similarly, on the uplink, the UE may send packets on both the primary and secondary RATs. In this case, the packets received by the network node on the secondary RAT are forwarded to the network node on the primary RAT for delivery to the upper layers of the primary RAT.

Figure 8:
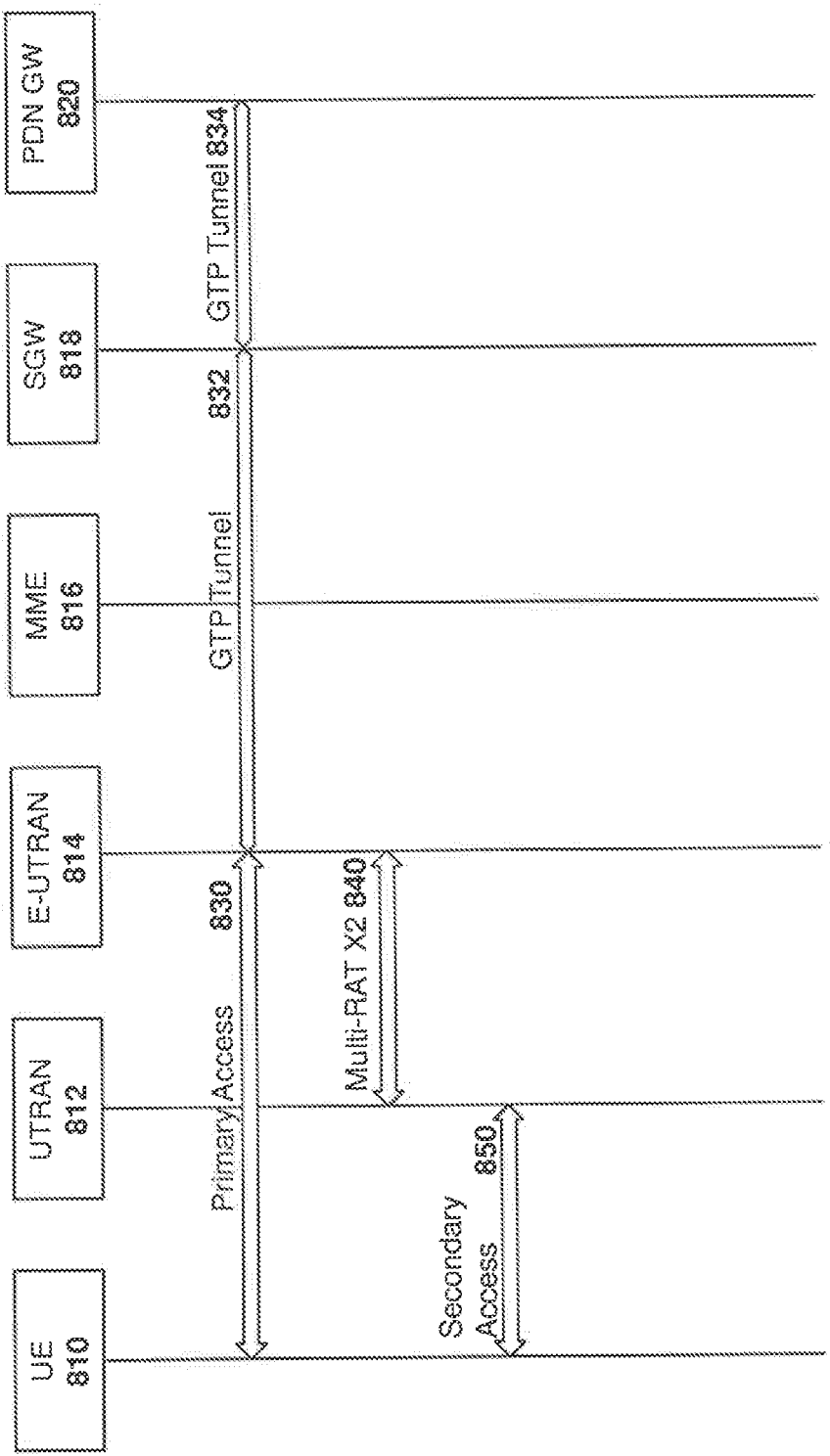
FIG. 8 is a flow diagram for signaling in a multi-RAT network.

Reference is now made to FIG. 8, which shows an exemplary scenario where the E-UTRAN is the primary RAT and the UTRAN is the secondary RAT.

With reference to FIG. 8, UE 810 communicates with both UTRAN 812 and E-UTRAN 814.

Similarly, the E-UTRAN 814, in the embodiment of FIG. 8, communicates with MME 816, as well as SGW 818. SGW 818 communicates with PDN-GW 820.

From UE 810, primary access is established with E-UTRAN 814, as shown by arrow 830. E-UTRAN 814 has a GTP tunnel between itself and SGW 818, as shown by arrow 832.

The GTP tunnel continues from SGW 818 to PDN-GW 820, as shown by arrow 834.

UTRAN 812 and E-UTRAN 814 include the multi-RAT X2 interface between them in the embodiment of FIG. 8, as shown by arrow 840 and therefore UE 810 can have secondary access to the UTRAN 812, as shown by arrow 850.

In accordance with various embodiments, the interface between the RATs may be either at the PDCP layer, the RLC layer, the MAC layer or the IP layer. Each is described below.

PDCP Layer

In a multi-RAT transmission, the interface between two RATs may be at the PDCP layer. This is the case for both the interface at the UE and between the network nodes over the multi-RAT X2.

In one embodiment, on the uplink, the UE may initiate an application on the LTE RAT. The application packets are sent to the PDCP layer of the LTE RAT and some or all of the packets may be forwarded to the HSPA PDCP layer over the multi-RAT PDCP interface at the UE. Packets flow through both protocol stacks and are then sent to their respective receiving network nodes. At the PDCP layer of the receiving NodeB, the packets are sent to the LTE PDCP layer over the multi-RAT X2 interface. A similar packet flow procedure may be used for downlink multi-RAT transmissions.

Figure 9:
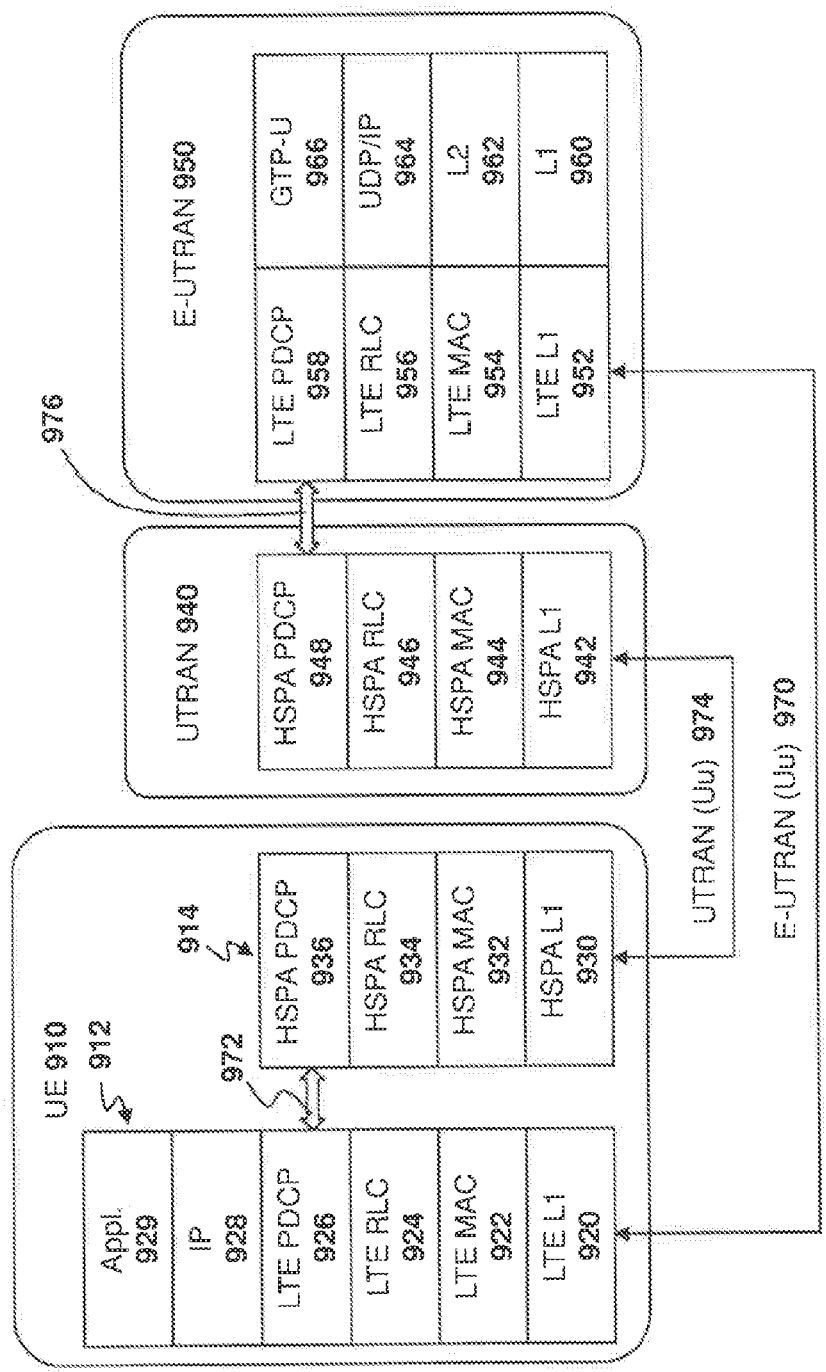
FIG. 9 is a protocol stack showing signaling between elements within a multi-RAT network.

Reference is now made to FIG. 9, which shows a multi-RAT procedure and the interface between the protocol stacks at the UE and between the UTRAN and E-UTRAN. In particular, UE 910 includes an LTE protocol stack 912 and an HSPA protocol stack 914. In LTE protocol stack 912, the UE 910 includes an LTE L1 layer 920, an LTE MAC layer 922, an LTE RC layer 924, an LTE-PDCP layer 926, an IP layer 928 and an application layer 929.

For the HSPA layer 914, the UE 910 includes an HSPA L1 930, an HSPA MAC layer 932, HSPA RLC layer 934 and an HSPA PDCP layer 936.

As will be appreciated by those in the art, the two protocol stacks differ with regard to the IP and application layers since the LTE network is the primary RAT.

A UTRAN 940 includes a protocol stack for communicating with protocol stack 914 and in particular includes HSPA L1 942, HSPA MAC layer 944, HSPA RLC layer 946 and HSPA PDCP layer 948.

Similarly, an E-UTRAN 950 includes an LTE L1 layer 952, LTE MAC layer 954, LTE RLC layer 956, and LTE PDCP layer 958. E-UTRAN 950 further includes a protocol layer for communicating with the core network and includes an L1 960, L2 962, UDP/IP layer 564 and GTP-U layer 966.

As seen in the embodiment of FIG. 9, the communication may be over the PDCP layer from LTE PDCP layer 926 either to LTE PDCP layer 958 directly through the E-UTRAN Uu interface 970. Alternatively, the LTE PDCP layer 926 may communicate with HSPA PDCP layer 936 as shown by interface 972. HSPA PDCP layer 936 may then communicate with the HSPA PDCP layer 948 of the UTRAN 940 over a UTRAN Uu layer 974.

In the second case, the HSPA PDCP layer 948 communicates over the multi-RAT X2 backhaul 976 with LTE PDCP layer 958.

Figure 10:
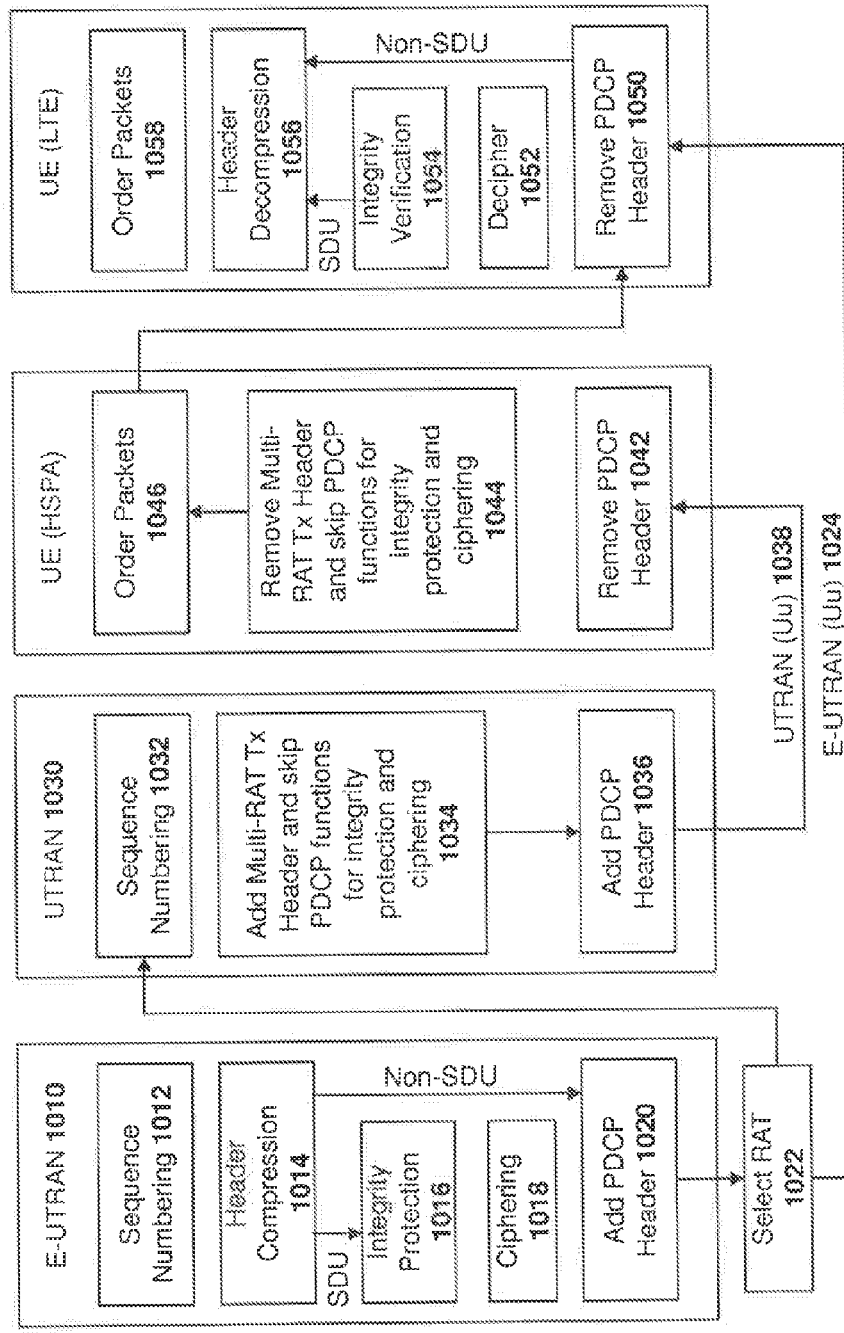
FIG. 10 is a process diagram showing the modifications to a packet being communicated over a multi-RAT network at the PDCP layer.

The multi-RAT communications at the PDCP layer requires changes at the PDCP layer itself. These are illustrated below with regard to FIG. 10. The example of FIG. 10 shows downlink communication for multi-RAT transmissions to a multi-RAT UE where LTE is the primary RAT and HSPA is the secondary RAT. Figures for uplink transmissions, as well as for the HSPA being the primary RAT, are similar to those of FIG. 10.

In FIG. 10, application packets arrive at the PDCP layer of the LTE eNB, as shown by E-UTRAN 1010. The LTE PDCP layer assigns a sequence number to the packets, as shown by block 1012. The header is then compressed at block 1014. For service data unit (SDU) packets, the process proceeds to block 1016, in which integrity protection is added and then cyphering is added at block 1018. From block 1018, the process proceeds to block 1020 in which the PDCP header is added. Similarly for non-SDU packets, from block 1014 the proceeds to block 1020.

Before sending the packet to a lower LTE layer, the packet passes through a RAT selection process, as shown by block 1022, where one or both RATs may be selected to transmit the packet to the UE. If the LTE RAT is selected, the packet is sent to the UE using existing LTE procedures, as shown by arrow 1024.

Conversely, if either the HSPA RAT or both RATs are selected at block 1022, then the packet is sent over the multi-RAT X2 interface to the PDCP layer of the UTRAN node 1030. In the case of a small cell heterogeneous network environment, in order to enable a "make before break" handover, the PDCP PDU may be duplicated in one embodiment with the identical content and sequencing number before it is sent to lower LTE layers.

The HSPA PDCP layer selects the LTE packets and applies its own modifying PDCP functions with blocks 1032 and 1034. The modifications to the PDCP layer include adding a multi-RAT header and adding logic to skip the header compression cyphering and integrity protection steps, since these are already performed by the LTE RAT. An HSPA PDCP layer is added before sending the packet to the lower HSPA layers for transmission to the UE, as shown by block 1036. The sending is over the UTRAN Uu interface, shown by arrow 1038.

At the receiving end, the UE receives the packet from both RATs or from one of the RATs. At the HSPA PDCP layer, the UE first removes the HSPA PDCP header, as shown by block 1042. After applying the modified HSPA PDCP functions at block 1044, the packets are ordered, shown by block 1046, and sent to the LTE PDCP layer over a multi-RAT PDCP interface at the UE.

At the UE LTE PDCP layer, the PDCP layer header is removed, as shown by block 1050 and deciphering and integrity verification occur at blocks 1052 and 1054 respectively for SDU packets. Header decompression then occurs at block 1056. Non-SDU packets proceed directly from block 1050 to 1056.

The packets are then ordered at block 1058 in accordance with the sequence number and can then be delivered to the LTE upper layers. The receiving side can select or combine the identical LTE PDCP PDUs if the PDCP PDUs are received from both the HSPA and LTE networks.

In one embodiment, if different packets from the same radio bearer are sent over different RATs then there may be an increase in the packet delay if one of the RATs is slower. In order to limit the impact on packet delay, a timer can be set for acknowledging the packets. If the timer expires before the packet is acknowledged then the packet may be sent on the other RAT. If there are large packet delays on one of the RATs then all of the packets may be sent over the better RAT in one embodiment.

RLC Layer

Figure 11:
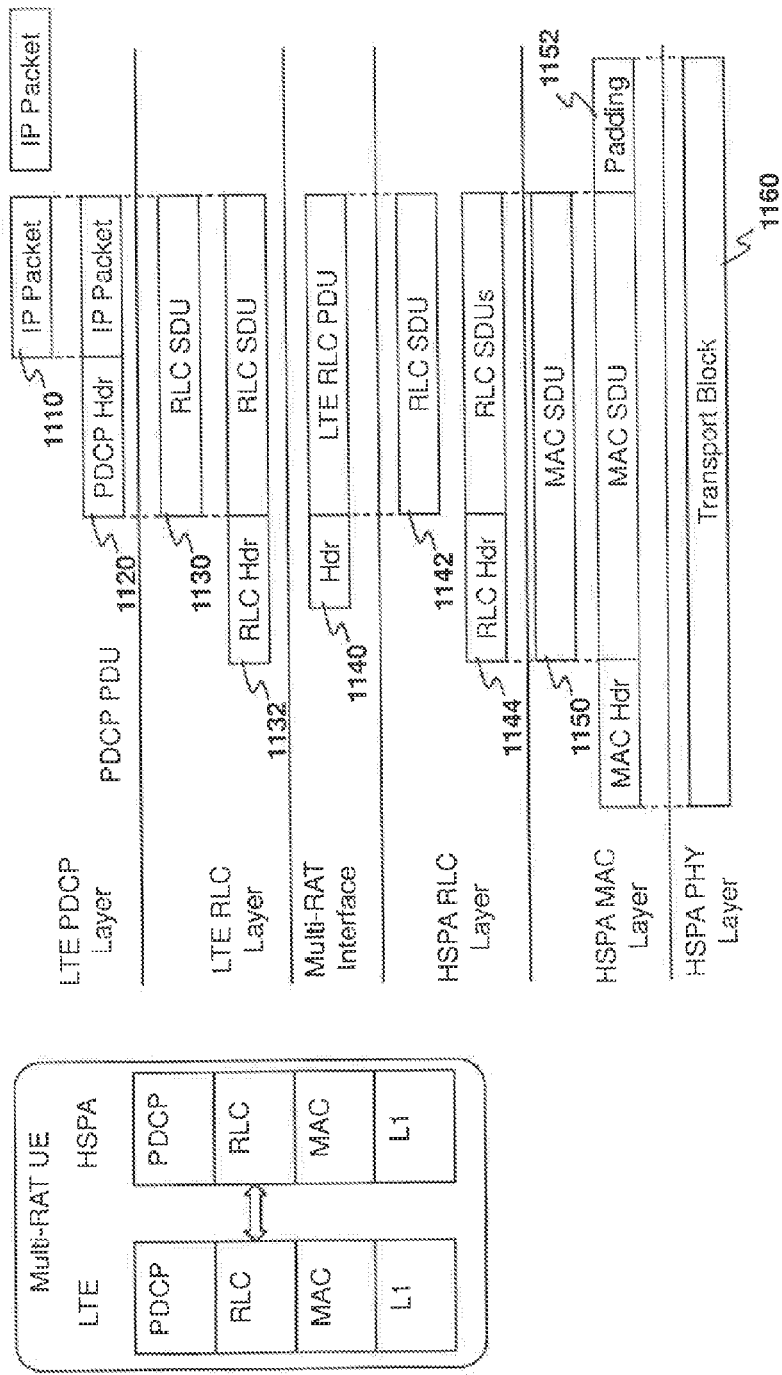
FIG. 11 is a block diagram showing a multi-RAT interface at the RLC layer.

In an alternative embodiment, the interface between the two RATs may be at the RLC layer. In this case, the RLC PDU from the primary RAT may be encapsulated and sent to the secondary RAT. A multi-RAT header may be attached to the RLC protocol data unit (PDU). When the packet is received by the RLC of the secondary RAT, the multi-RAT header may be removed and the packet treated as an RLC SDU by the secondary RAT. Reference is now made to FIG. 11.

In FIG. 11, an IP packet 1110 is received from the application layer and a PDCP header is added at the LTE PDCP layer, as shown by reference numeral 1120. The LTE RLC Layer converts the PDCP packet into an RLC SDU, as shown by reference numeral 1130 and an RLC header is added, as shown by reference numeral 1132.

The RLC SDU is then transported over the multi-RAT interface with a header and an LTE RLC PDU as shown by block 1140. At the HSPA RLC layer, the RLC header and RLC SDU are created, as shown by blocks 1142 and 1144.

The RLC header and RLC SDUs are converted to MAC SDUs at the HSPA MAC layer, as shown by block 1150 and a MAC header and padding are added at block 1152.

The packet is then transported at the HSPA physical layer, shown by block 1160.

Since the channel quality is likely to be different for different RATs, a different RLC PDU segment size may be selected by each RAT where the segment size may fit within the total size of the RLC PDUs indicated by the lower layer in a particular transmission opportunity. In this case, feedback from the primary RAT or the total size of the RLC PDU for particular transmission opportunity may be available, for example through the multi-RAT X2 interface, for proper RLC PDU segment sizes selection.

Alternatively, the multi-RAT backhaul interface may be between the PDCP layer of the primary RAT and the RLC layer of the secondary RAT. This may reduce the complexity of performing the RLC layer functions in both RATs.

MAC Layer

In an alternative, the interface between the two RATs may be at the MAC layer. In this case, the MAC PDU from the primary RAT may be encapsulated and sent to a secondary RAT. A multi-RAT header may be attached to the MAC PDU from the primary RAT. When the packet is received by the MAC layer of the secondary RAT, the multi-RAT header may be removed and the packet treated as a MAC SDU by the secondary RAT. This is illustrated below with regard to FIG. 12.

Figure 12:
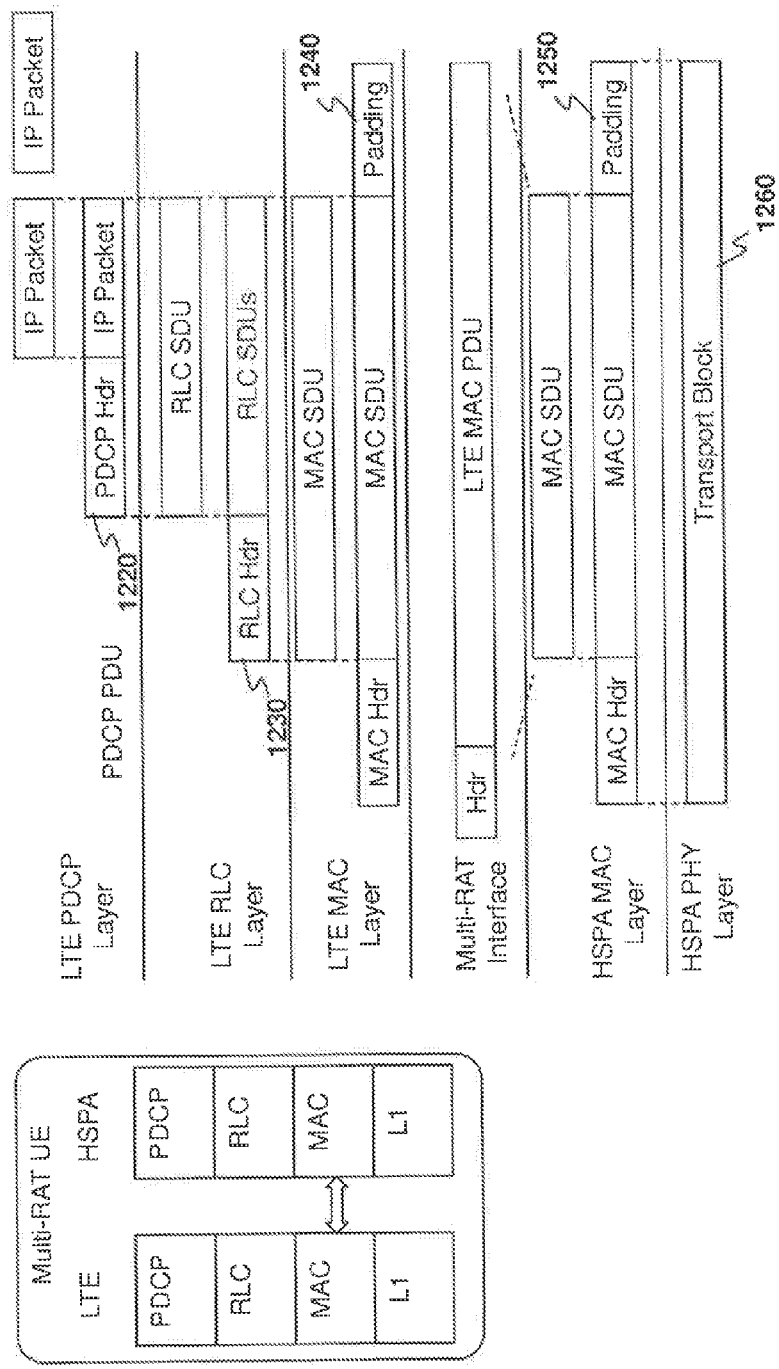
FIG. 12 is a block diagram showing a multi-RAT interface at the MAC layer.

In accordance with the embodiment of FIG. 12, an IP packet is received from an application layer on a multi-RAT UE and at the PDCP layer a PDCP header is added, as shown by reference numeral 1220. The packet is then provided to the RLC layer which uses the PDCP header and the IP packet as the RLC SDU and adds an RLC header as shown by reference numeral 1230.

The RLC header and RLC SDUs are provided to the MAC layer, which then treats them as a MAC SDU and adds a MAC header and padding as shown by reference numeral 1240. The packet is then provided with a multi-RAT header and transported over the multi-RAT interface to the HSPA MAC layer.

At the HSPA MAC layer, the header is stripped and the HSPA MAC layer treats the packet as a MAC SDU. The secondary RAT then adds a MAC header and padding, shown by block 1250, and sends the packet over the physical layer transport layer as a transport block 1260.

IP Layer

In a fourth embodiment, the multi-RAT backhaul interface may be at the IP layer. In this case, IP packets are diverted to the secondary RAT and the full radio protocol stack is enabled on both RATs. Another layer may be inserted between the IP layer and the PDCP layer to handle the RAT selection process.

Figure 13:
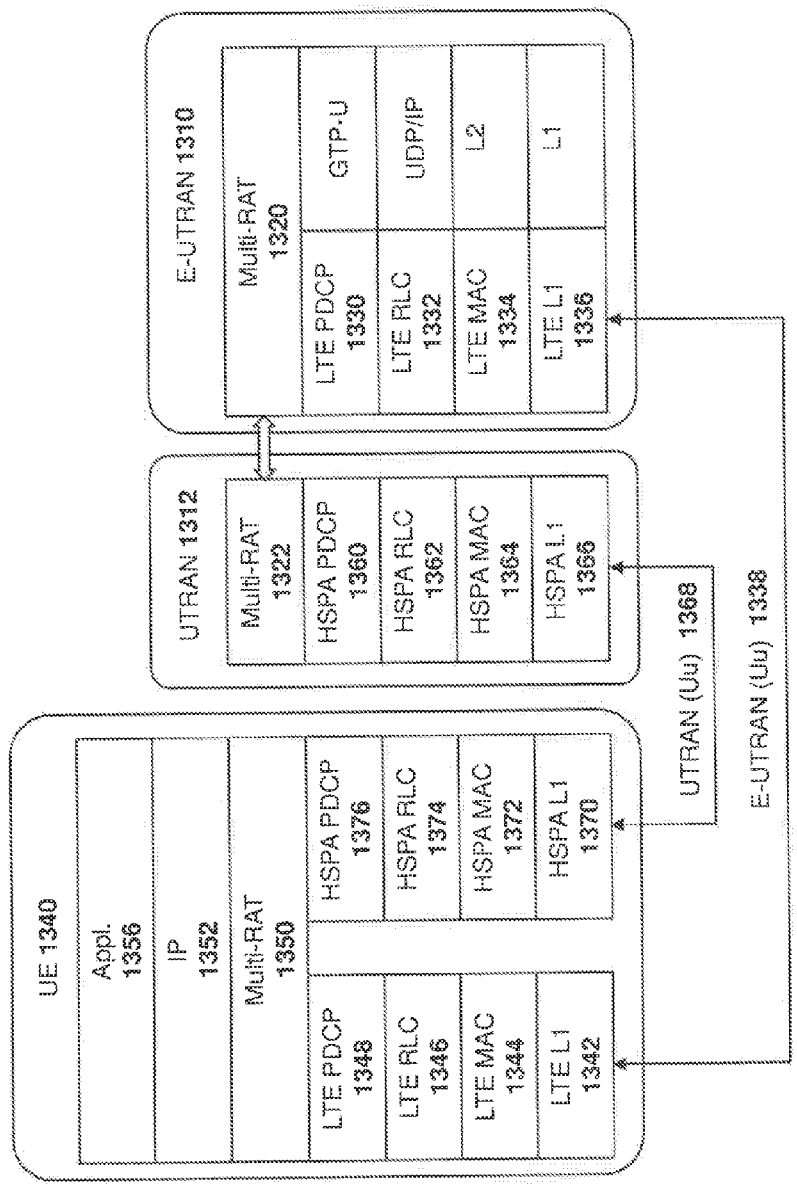
FIG. 13 is a block diagram showing a protocol stack adding a new multi-RAT protocol layer.

The above is illustrated with regard to FIG. 13. In particular, in FIG. 13 the IP packet is sent between a multi-RAT layer 1320 of E-UTRAN 1310 and multi-RAT layer 1322 of UTRAN 1312. Protocol stacks, including the LTE PDCP layer 1330, the LTE RLC layer 1332 the LTE MAC layer 1335 and the LTE L1 layer 1336 are used.

The communication can then be transmitted over the E-UTRAN Uu interface 1338 to the LTE protocol stack on UE 1340. The LTE protocol stack on UE 1340 includes LTE L1 layer 1342, LTE MAC layer 1344, LTE RLC layer 1346, and LTE PDCP layer 1348. The multi-RAT layer 1350, IP layer 1352 and application layer 1356 are then used for both HSPA and LTE.

Similarly, UTRAN 1312 includes a HSPA PDCP layer 1360, HSPA RLC layer 1362, HSPA MAC layer 1364, and HSPA L1 layer 1366, and communication is then sent over the UTRAN Uu interface 1368.

At the UE 1340, HSPA L1 layer 1370 forms the first part of the HSPA protocol stack. Similarly HSPA MAC layer 1372, HSPA RLC layer 1374 and HSPA PDCP layer 1376 form the HSPA protocol stack before a multi-RAT layer 1350. Thus, the use of the IP adds the multi-RAT layer 1320 and 1322 to the E-UTRAN 1310 and the UTRAN 1312, respectively.

With the above, each of the layers can be used where a header is added for the multi-RAT X2 interface which can then be stripped at the other of the primary or the second RAT to form the packet at the appropriate layer of the protocol stack. This approach may also be used to aggregate LTE with WiFi (e.g. IEEE 802.11n, 11 ad, 11af). In this case, The LTE RAT is the primary RAT and can decide when to offload some or all of the packets to WiFi. The multi-RAT X2 interface may be between the WiFi MAC layer and the LTE IP, PDCP, RLC or MAC layer. A new RAT selection layer may be inserted below the LTE IP, PDCP or RLC layer to handle the RAT selection process between LTE and WiFi. A similar multi-RAT interface may be implemented at the UE to forward the packets received from WiFi to LTE. Feedback for the WiFi transmissions (e.g. ACK/NACK and CQI) may be sent on the LTE UL and forwarded to the WiFi AP over the multi-RAT X2. This may be used when there are coexistence issues in the case where the LTE carrier is adjacent to the band used by WiFi.

Handover

As the UE moves across network coverage areas of both the primary and the secondary RATs, the UE may need to handover from one network node on the primary RAT, the secondary RAT or both. Multi-RAT transmissions can be used to reduce handover interruption times.

In a first embodiment, handover may occur on the primary RAT. If the UE moves out of the coverage area of the network node on the primary RAT and remains within the coverage area of the network node on the secondary RAT, the UE may still receive packets from the secondary RAT while undergoing handover on the primary RAT. This embodiment may occur, for example, where the primary RAT is a small cell LTE cell and the secondary RAT is a much larger UMTS cell. If the UE receives a handover command on the primary RAT then the UE detaches from the old cell and synchronizes with the new cell of the primary RAT. The primary RAT then transfers the buffered and in transit packets to the target cell. If the target cell has enough resources to handle the UE's traffic without assistance from the secondary RAT then the buffered packets may be forwarded to the target cell of the primary RAT.

Otherwise, if the target cell of the primary RAT cannot support the additional data flow, the target cell may establish a multi-RAT backhaul connection with the network node of the secondary RAT. The source primary RAT sends handover information to the target primary RAT so that the target primary RAT can determine if it is capable of handling the traffic for the UE or if it needs assistance from the secondary RAT. The handover information may include information such as buffer size, traffic type and delay or quality of service constraints.

The packets that were sent to the secondary RAT node may be transmitted to the UE without any interruption since the UE maintains the connection on the secondary RAT. Similarly, on the uplink, the UE may continue to send data without any interruption.

Figure 14:
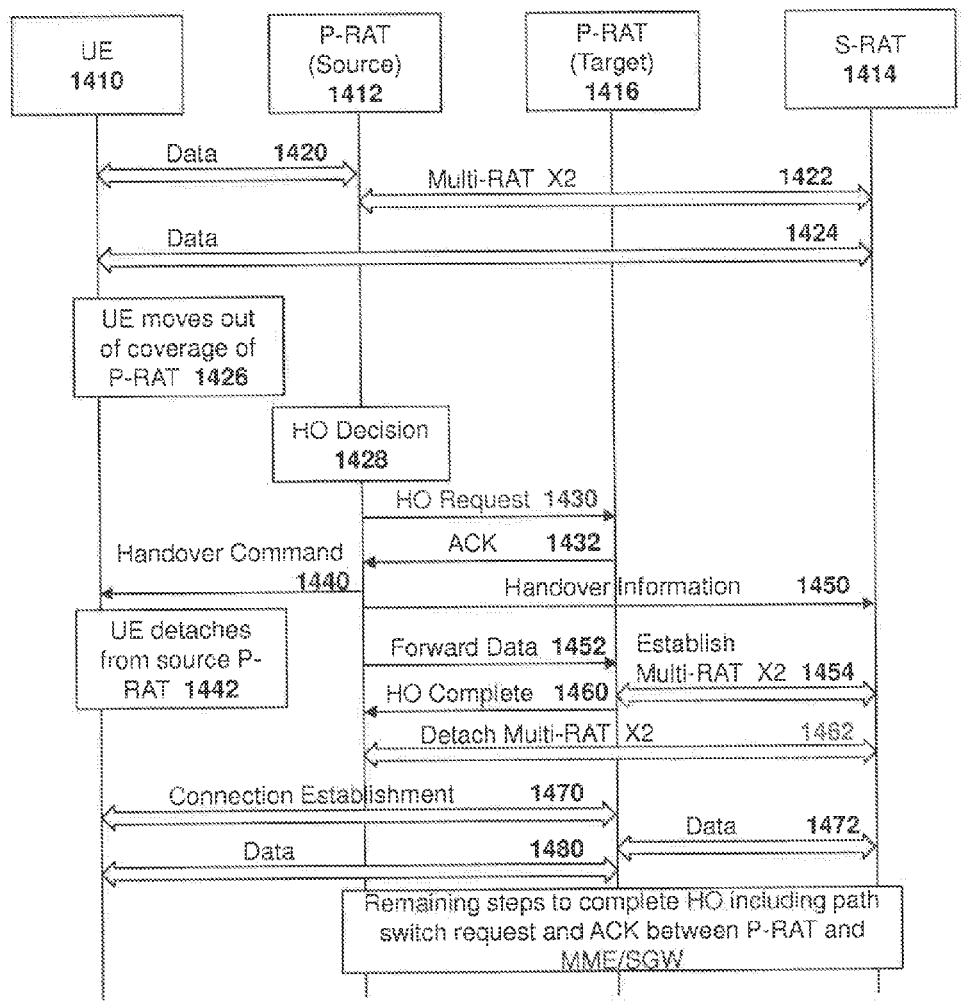
FIG. 14 is a flow diagram showing handover at a primary RAT.

Reference is now made to FIG. 14 which shows a UE 1410 communicating with a primary RAT 1412 and a secondary RAT 1414. The UE moves out of the coverage area of primary RAT 1412 and into coverage area of a second, target primary RAT 1416.

Initially, UE 1410 includes a data connection 1420 with the source primary RAT 1412 and the source primary RAT 1412 includes a multi-RAT X2 interface with secondary RAT 1414, as shown by arrow 1422.

Data may then be exchanged between secondary RAT 1414 and UE 1410, as shown by arrow 1424.

Once the UE moves out of coverage of the primary RAT, as shown by block 1426, the primary RAT 1412 makes a handover decision, shown by block 1428.

The source primary RAT 1412 makes a handover request to target primary RAT 1416, as shown by arrow 1430 and an acknowledgement is sent back to the source primary RAT 1412, as shown by arrow 1432. The source primary RAT 1412 then sends a handover command 1440 to UE 1410.

Once the handover command is received, the UE detaches from the source primary RAT, as shown by block 1442.

While the UE is detaching, the source primary RAT 1412 sends handover information to the secondary RAT 1414, as shown by arrow 1450. The source primary RAT 1412 further forwards data to the target primary RAT 1416, as shown by arrow 1452.

If required, target primary RAT 1416 may establish a multi-RAT X2 interface, as shown by arrow 1454.

The source primary RAT 1412 then can receive a handover complete command from the target primary RAT 1416, as shown by arrow 1460 and detach the multi-RAT X2 interface, as shown as arrow 1462.

Thus, based on the above, during messages 1450 to 1462, the UE may continue to receive data from the secondary RAT.

The UE then performs a connection establishment with the target primary RAT 1416, as shown by arrow 1470. Data can then be passed from target primary RAT 1416 to the secondary RAT 1414, as shown by arrow 1472 and this data can then be transmitted to the UE 1410 from one or both of the RATs.

In one embodiment, if the handover is an S1-based handover, the primary RAT may inform the secondary RAT to terminate the connection towards the UE before the actual S1 handover occurs.

In a second embodiment, if the UE moves out of the coverage area of the secondary RAT, while still within the coverage area of the primary RAT, the UE may undergo a handover on the secondary RAT. The decision on whether to handover the UE to another secondary RAT node depends on whether or not the primary RAT node and target secondary RAT node can establish a multi-RAT backhaul and the available resources on the target secondary RAT node.

The handover procedure of the secondary RAT is simplified compared to that of the primary RAT since there is no path switch required at the MME and the serving gateway. Since the multi-RAT transmission is transparent to the core network, the MME and serving gateway are not aware of the handover on the secondary RAT.

In this case, the source network node of the secondary RAT makes a handover decision based on the UEs neighbor cell measurements and based on the availability of the target node of the secondary RAT.

Figure 15:
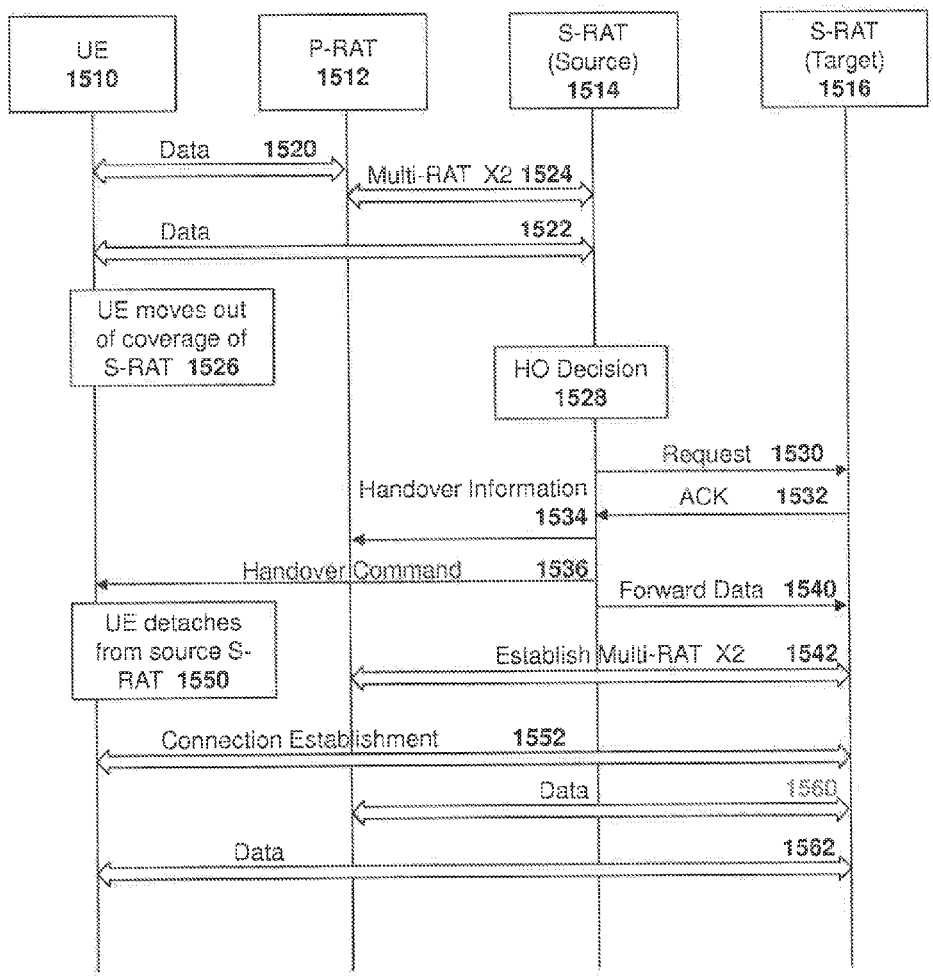
FIG. 15 is a flow diagram showing handover at a secondary RAT.

If the target secondary RAT node has enough resources to admit the UE then the multi-RAT transmission handover of the secondary RAT is illustrated in the signalling diagram in FIG. 15.

Referring to FIG. 15, a UE 1510 initially communicates with a primary RAT 1512 and a source secondary RAT 1514. In accordance with the embodiment of FIG. 15, a target secondary RAT 1516 may be used for communication and the secondary RAT is transferred from the source secondary RAT 1512 to target secondary RAT 1516.

In particular, UE 1510 includes a data connection with the primary RAT 1512, as shown by arrow 1520 and a data connection with the source secondary RAT 1514, as shown by arrow 1522. Further, a multi-RAT X2 interface exists between primary RAT 1512 and source secondary RAT 1514, as shown by arrow 1524.

The UE moves out of the coverage area of the secondary RAT, as shown by block 1526 and the source secondary RAT 1514 then makes a handover decision, as shown by block 1528. Based on measurement reports, the source secondary RAT 1514 makes a handover request to target secondary RAT 1516, as shown by arrow 1530. The handover request may include information about primary RAT 1512 in one embodiment. An acknowledgement is received at arrow 1532.

The source secondary RAT 1514 provides handover information to the primary RAT 1512, as shown by arrow 1534, and further sends a handover command to UE 1510, as shown by arrow 1536.

The secondary RAT 1514 provides data for the UE to the target secondary RAT 1516, as shown by arrow 1540, and a multi-RAT X2 interface is established between the primary RAT 1512 and the target secondary RAT 1516, as shown by arrow 1542.

The UE then detaches from the source secondary RAT 1514, as shown by block 1550 and makes a connection establishment with the target secondary RAT 1516, as shown by arrow 1552. Between the handover at arrow 1536 and the connection establishment at arrow 1552, the UE can continue to receive data from the primary RAT.

Once the connection is established between UE 1510 and secondary RAT 1516, data connections can be established between the target secondary RAT 1516 and the primary RAT 1512, as shown by arrow 1560 and also between the target secondary RAT 1516 and UE 1510, as shown by arrow 1562.

Based on FIG. 15, the handover therefore occurs without the UE losing data connectivity with the primary RAT.

In a third embodiment, the UE may move out of the coverage area of both the primary and the secondary RAT simultaneously. This case may occur when the primary and the secondary nodes are co-located. In this case, the UE may first begin a handover procedure for the primary RAT, while maintaining a connection on the secondary RAT. During the handover procedure on the primary RAT, the primary RAT and the secondary RAT exchange the multi-RAT handover information. This includes the target node of both RATs.

Once the handover information is exchanged, and if it is determined that the target node on the secondary RAT will assist transmission to the UE, the target nodes of both RATs may setup a multi-RAT backhaul for the specified UE. When the setup is complete, the source node of the secondary RAT sends a handover command to the UE.

After the UE synchronizes and establishes a connection with the target node of the secondary RAT, the target node of the secondary RAT informs the target node of the primary RAT that the handover of the secondary RAT is complete. Since the IP packets are only sent to the primary RAT, the handover on the secondary RAT is simplified. The remaining steps in the handover procedure are performed by the nodes on the primary RAT. These steps include the path switch request and acknowledgement by the MME and serving gateway.

Figure 16:
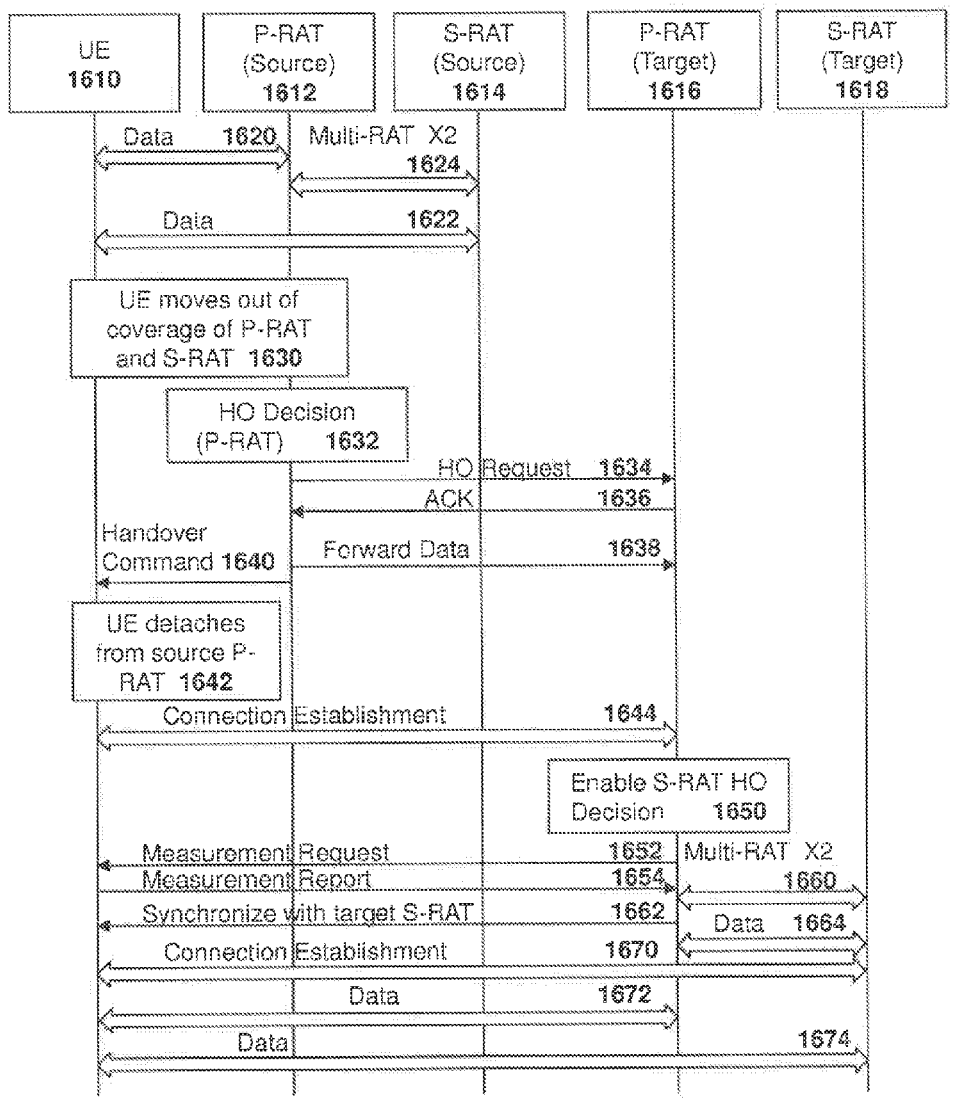
FIG. 16 is a flow diagram showing handover at a primary and secondary RAT.

A signalling diagram for the handover of both the primary and the secondary RATs is shown with regard to FIG. 16. Referring to FIG. 16, UE 1610 communicates with both the primary RAT 1612 and the secondary RAT 1614. Initially, a data connection is established between the primary RAT and UE as well as the secondary RAT and the UE, as shown by arrows 1620 and 1622. Further, a multi-RAT X2 interface is established between the primary RAT 1612 and the secondary RAT 1614, as shown by arrow 1624.

The UE then moves out of the coverage of the primary and the secondary RATs, as shown by block 1630 and the primary RAT 1612 makes a handover decision based on measurement reports to a target primary RAT 1616, as shown by block 1632.

The source primary RAT 1612 sends a handover request 1634 to the target primary RAT 1616 and an acknowledgement is sent back at arrow 1636. At this point, primary RAT 1612 forwards data to the target primary RAT 1616, as shown by arrow 1638, as well as a handover command to the UE, as shown by arrow 1640.

After receiving the handover command, the UE detaches from the source primary RAT as shown by block 1642 and provides a connection establishment, as shown by arrow 1644, with the target primary RAT 1616.

Target primary RAT 1616 then enables a secondary RAT handover decision, as shown by block 1650 and sends a measurement request to the UE 1610, as shown by arrow 1652. The measurement report is provided from the UE at arrow 1654 and based on the measurement report a multi-RAT X2 interface is established with a secondary RAT 1618, as shown by arrow 1660. A command is sent from the target primary RAT 1616 to UE 1610 to synchronize with the target secondary RAT, as shown by arrow 1662 and at that point a data connection may be established between the primary RAT 1616 and the secondary RAT 1618, as shown by arrow 1664.

A connection establishment is performed between the UE and the target secondary RAT 1618, as shown by arrow 1670, at which point data can proceed either from the target primary RAT 1616 and the UE 1610 or the target secondary RAT 1618 and the UE 1610, as shown by arrows 1672 and 1674 respectively.

In a fourth embodiment, a handover may occur from the primary RAT to the secondary RAT. For example, it may be possible that the primary RAT is no longer available when the UE moves out of the coverage of the primary RAT node. For example, if the primary RAT is an LTE hotspot, it may not be available beyond the LTE small cell. Since there is no target primary RAT, the entire session may be handed over to the secondary RAT. In this case, the secondary RAT then becomes the primary RAT with a full connection to the core network.

When the UE moves out of the coverage area of the primary RAT node and the source primary RAT node makes the handover decision, it sends a handover request message to the secondary RAT node. Since the UE is already synchronized and communicating with the secondary RAT node, this message is to instruct the node to complete the handover. The secondary RAT node will then become the primary RAT node.

The primary RAT node also sends a handover command to the UE to inform it that the secondary RAT node will become the new primary RAT node and that it can detach from the primary RAT node. The handover command may include new encryption keys for communicating with the new target node when the handover is completed. There may be an indication in the handover command which specifies the secondary RAT becoming the new primary RAT as the primary cell and the UE may start to monitor the control channel such as the PDCCH in case of LTE from the new primary RAT and sending the control channel such as the PUCCH in the case of LTE to the new primary RAT after handover.

The secondary RAT may send a path switch request to the MME and the MME may send an update user plane request to the serving gateway as in a normal handover. The secondary RAT continues to serve the UE from packets forwarded on the multi-RAT backhaul until the path switch is complete. When the path switch is complete, the multi-RAT X2 can be disabled for the UE.

An indication may also be provided in the path switch request that specifies that the secondary RAT becomes the new primary RAT as a primary cell and that the MME will receive a non-access stratum (NAS) message to the UE, for example through a downlink information transfer.

Figure 17:
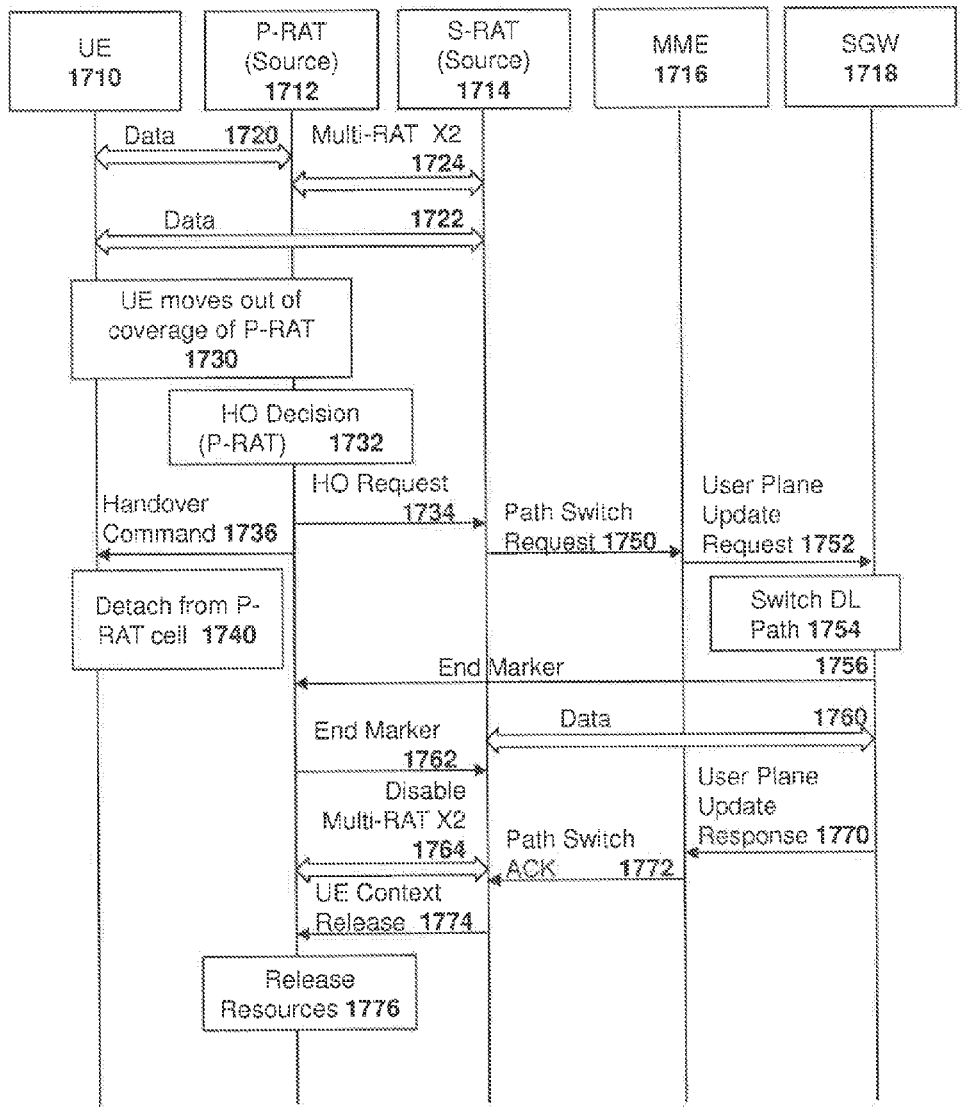
FIG. 17 is a flow diagram showing handover from the primary RAT to the secondary RAT.

Reference is now made to FIG. 17. In particular, UE 1710 is served by a primary RAT 1712 and a secondary RAT 1714, and can receive data from both, as shown by arrows 1720 and 1722 respectively. A multi-RAT X2 interface is established between primary RAT 1712 and secondary RAT 1714, as shown by arrow 1724.

The UE moves out of the coverage range of the primary RAT 1712, as shown by block 1730 and thus the primary RAT 1712 makes a handover decision as shown by block 1732. A handover request is then made to the secondary RAT 1714, as shown by arrow 1734, and a handover command is sent to UE 1710, as shown by arrow 1736. The UE then detaches from the primary cell, as shown by block 1740.

When the handover request is made to the source secondary RAT 1714 then the secondary RAT 1714 makes a path switch request to MME 1716, as shown by arrow 1750 and a user plane update request is then made between MME 1716 and SGW 1718, as shown by arrow 1752.

The SGW 1718 then switches the downlink path, as shown by block 1754 and sends an end marker to the primary RAT 1712, as shown by arrow 1756.

A data connection is then established between the secondary RAT 1714 and the SWG 1718, shown by arrow 1760.

The primary RAT sends an end marker to the secondary RAT 1714, as shown by arrow 1762 and the multi-RAT X2 interface is disabled, as shown by arrow 1764.

SGW 1718 then sends a user plane update response to MME 1716, as shown by arrow 1770 and the path switch acknowledgement is sent from MME 1716 to the secondary RAT 1714, as shown by arrow 1772. The secondary RAT 1714 then sends a UE context release to the primary RAT 1712, as shown by arrow 1774 and then the primary RAT 1712 may release resources, shown by block 1776. Based on the above, secondary RAT 1714 becomes the primary RAT.

The above may be implemented by any network element. A simplified network element is shown with regard to FIG. 18.

Figure 18:
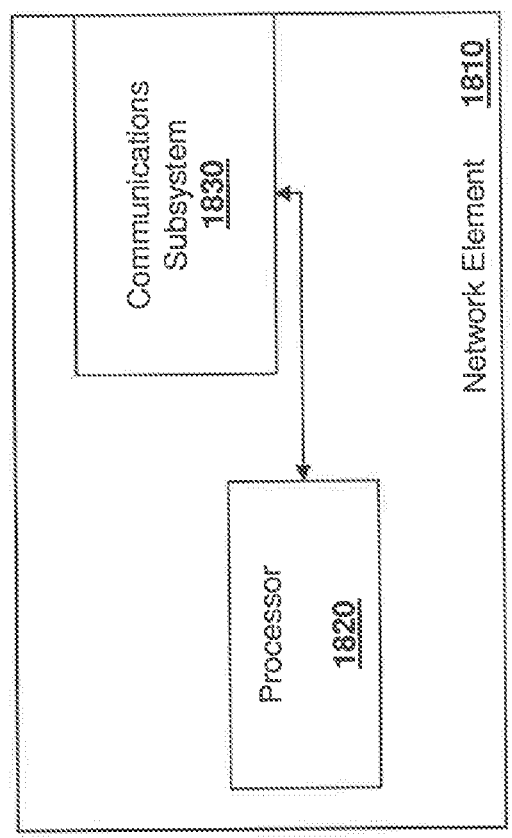
FIG. 18 is a simplified block diagram of an example network element.

In FIG. 18, network element 1810 includes a processor 1820 and a communications subsystem 1830, where the processor 1820 and communications subsystem 1830 cooperate to perform the methods described above.

Further, the above embodiments may be implemented by any UE. One exemplary device is described below with regard to FIG. 19.

UE 1900 is typically a two-way wireless communication device having voice and data communication capabilities. UE 1900 generally has the capability to communicate with other computer systems on the Internet. Depending on the exact functionality provided, the UE may be referred to as a data messaging device, a two-way pager, a wireless e-mail device, a cellular telephone with data messaging capabilities, a wireless Internet appliance, a wireless device, a mobile device, or a data communication device, as examples.

Where UE 1900 is enabled for two-way communication, it may incorporate a communication subsystem 1911, including both a receiver 1912 and a transmitter 1914, as well as associated components such as one or more antenna elements 1916 and 1918, local oscillators (LOs) 1913, and a processing module such as a digital signal processor (DSP) 1920. As will be apparent to those skilled in the field of communications, the particular design of the communication subsystem 1911 will be dependent upon the communication network in which the device is intended to operate. Further, communications subsystem 1911 may be capable of communicating with multiple RATs, and have a plurality of antennas and other components in some embodiments.

Network access requirements will also vary depending upon the type of network 1919. In some networks network access is associated with a subscriber or user of UE 1900. A UE may require a removable user identity module (RUIM) or a subscriber identity module (SIM) card. The SIM/RUIM interface 1944 is normally similar to a card-slot into which a SIM/RUIM card can be inserted and ejected. The SIM/RUIM card can have memory and hold many key configurations 1951, and other information 1953 such as identification, and subscriber related information.

Figure 19:
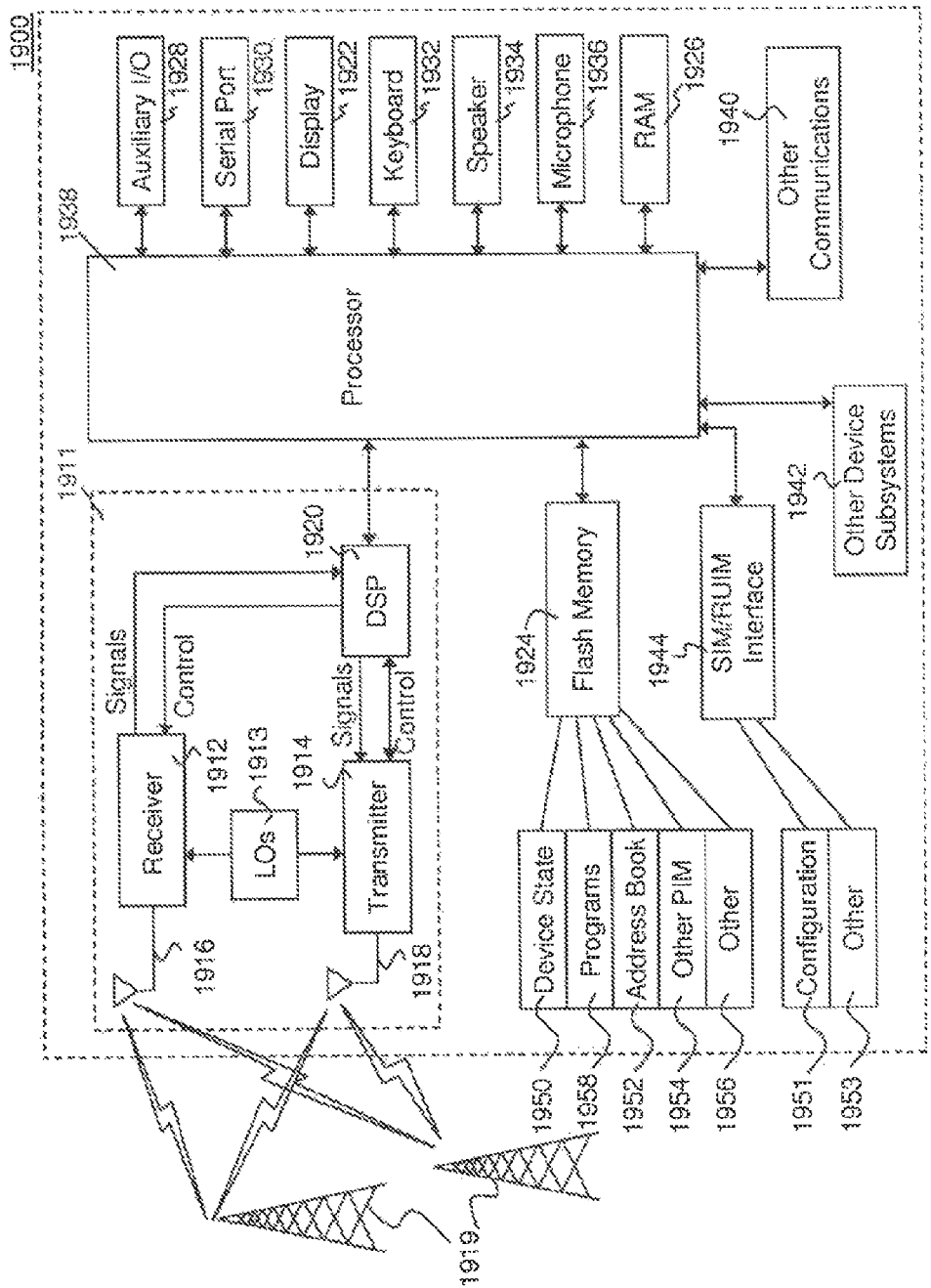
FIG. 19 is a block diagram of an example user equipment.

When required network registration or activation procedures have been completed, UE 1900 may send and receive communication signals over the network 1919. As illustrated in FIG. 19, network 1919 can consist of multiple base stations communicating with the UE. In one embodiment, network 1919 can comprise multiple RATs.

Signals received by antenna 1916 from communication network 1919 are input to receiver 1912, which may perform such common receiver functions as signal amplification, frequency down conversion, filtering, channel selection and the like. A/D conversion of a received signal allows more complex communication functions such as demodulation and decoding to be performed in the DSP 1920. In a similar manner, signals to be transmitted are processed, including modulation and encoding for example, by DSP 1920 and input to transmitter 1914 for digital to analog conversion, frequency up conversion, filtering, amplification and transmission over the communication network 1919 via antenna 1918. DSP 1920 not only processes communication signals, but also provides for receiver and transmitter control. For example, the gains applied to communication signals in receiver 1912 and transmitter 1914 may be adaptively controlled through automatic gain control algorithms implemented in DSP 1920.

UE 1900 generally includes a processor 1938 which controls the overall operation of the device. Communication functions, including data and voice communications, are performed through communication subsystem 1911. Processor 1938 also interacts with further device subsystems such as the display 1922, flash memory 1924, random access memory (RAM) 1926, auxiliary input/output (I/O) subsystems 628, serial port 630, one or more keyboards or keypads 1932, speaker 1934, microphone 1936, other communication subsystem 1940 such as a short-range communications subsystem, WiFi communications subsystem, among others, and any other device subsystems generally designated as 1942.

Serial port 1930 could include a USB port or other port known to those in the art.

Some of the subsystems shown in FIG. 19 perform communication-related functions, whereas other subsystems may provide "resident" or on-device functions. Notably, some subsystems, such as keyboard 1932 and display 1922, for example, may be used for both communication-related functions, such as entering a text message for transmission over a communication network, and device-resident functions such as a calculator or task list.

Operating system software used by the processor 1938 may be stored in a persistent store such as flash memory 1924, which may instead be a read-only memory (ROM) or similar storage element (not shown). Those skilled in the art will appreciate that the operating system, specific device applications, or parts thereof, may be temporarily loaded into a volatile memory such as RAM 1926. Received communication signals may also be stored in RAM 1926.

As shown, flash memory 1924 can be segregated into different areas for both computer programs 1958 and program data storage 1950, 1952, 1954 and 1956. These different storage types indicate that each program can allocate a portion of flash memory 1924 for their own data storage requirements. Processor 1938, in addition to its operating system functions, may enable execution of software applications on the UE. A predetermined set of applications that control basic operations, including at least data and voice communication applications for example, will normally be installed on UE 1900 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the UE such as, but not limited to, e-mail, calendar events, voice mails, appointments, and task items. Naturally, one or more memory stores would be available on the UE to facilitate storage of PIM data items. Such PIM application may have the ability to send and receive data items, via the wireless network 1919. Further applications may also be loaded onto the UE 1900 through the network 619, an auxiliary I/O subsystem 1928, serial port 1930, short-range communications subsystem 1940 or any other suitable subsystem 1942, and installed by a user in the RAM 1926 or a non-volatile store (not shown) for execution by the processor 1938. Such flexibility in application installation increases the functionality of the device and may provide enhanced on-device functions, communication-related functions, or both. For example, secure communication applications may enable electronic commerce functions and other such financial transactions to be performed using the UE 1900.

In a data communication mode, a received signal such as a text message or web page download will be processed by the communication subsystem 1911 and input to the processor 1938, which may further process the received signal for output to the display 1922, or alternatively to an auxiliary I/O device 1928.

A user of UE 1900 may also compose data items such as email messages for example, using the keyboard 1932, which may be a complete alphanumeric keyboard or telephone-type keypad, among others, in conjunction with the display 1922 and possibly an auxiliary I/O device 1928. Such composed items may then be transmitted over a communication network through the communication subsystem 1911.

For voice communications, overall operation of UE 1900 is similar, except that received signals would typically be output to a speaker 1934 and signals for transmission would be generated by a microphone 1936. Alternative voice or audio I/O subsystems, such as a voice message recording subsystem, may also be implemented on UE 1900. Although voice or audio signal output is generally accomplished primarily through the speaker 1934, display 1922 may also be used to provide an indication of the identity of a calling party, the duration of a voice call, or other voice call related information for example.

Serial port 1930 in FIG. 19 would normally be implemented in a personal digital assistant (PDA)-type UE for which synchronization with a user's desktop computer (not shown) may be desirable, but is an optional device component. Such a port 1930 would enable a user to set preferences through an external device or software application and would extend the capabilities of UE 1900 by providing for information or software downloads to UE 1900 other than through a wireless communication network. The alternate download path may for example be used to load an encryption key onto the device through a direct and thus reliable and trusted connection to thereby enable secure device communication. As will be appreciated by those skilled in the art, serial port 1930 can further be used to connect the UE to a computer to act as a modem.

Other communications subsystems 1940, such as a short-range communications subsystem, is a further optional component which may provide for communication between UE 1900 and different systems or devices, which need not necessarily be similar devices. For example, the subsystem 1940 may include an infrared device and associated circuits and components or a Bluetooth™ communication module to provide for communication with similarly enabled systems and devices. Subsystem 1940 may further include non-cellular communications such as WiFi or WiMAX, or near field communications, among others.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method at a user equipment operating in a mobile network having a first node with a first radio access technology and a second node with a second radio access technology, the method comprising:
    receiving, from the first node a request to perform an inter-radio access technology neighbor cell measurement;
    performing the inter-radio access technology neighbor cell measurement; and
    providing a report to the first network node, the report including an indication of whether a neighbor cell supports inter-radio access technology carrier aggregation, wherein inter-radio access technology carrier aggregation allows for concurrent utilization of radio resources of the first radio access technology of the first node and radio resources of the second radio access technology of the second node.

2. The method of claim 1, wherein the indication is a single bit.

3. The method of claim 1, further comprising receiving a request to connect to the second node.

4. The method of claim 3, wherein the request includes information to assist the user equipment to connect to the second node.

5. The method of claim 4, wherein the information includes a random access preamble to be used by the user equipment for the connection.

6. The method of claim 4, wherein the information includes synchronization information for the second node.

7. The method of claim 3, further comprising establishing a connection with the second node, the establishing including sending a user equipment identifier for the user equipment on the first node to the second node.

8. A method at a user equipment communicating with both a first node having a first radio access technology and a second node having a second radio access technology, the second node having a tunnel to a core network, the method comprising:
    receiving a protocol layer packet from the first node at the user equipment; and
    at a first radio access technology protocol layer corresponding to the protocol layer packet:
    removing a multi-radio access technology header;
    ordering the packet; and
    forwarding the packet to a second radio access technology protocol layer corresponding to the first radio access technology protocol layer;
    wherein the user equipment communicates concurrently with the first node via resources associated with the first radio access technology protocol layer and with the second node via resources associated with the second radio access technology protocol layer.

9. The method of claim 8, wherein the first radio access technology protocol layer is a packet data convergence protocol (PDCP) layer.

10. The method of claim 9, wherein the removing the multi-radio access technology header further comprising skipping other PDCP layer functionality.

11. The method of claim 9, further comprising removing a PDCP header before removing the multi-radio access technology header.

12. The method of claim 8, wherein the first radio access technology protocol layer is a radio link control (RLC) layer.

13. The method of claim 12, further comprising receiving an RLC protocol data unit (PDU) segment size for a transmission opportunity.

14. The method of claim 12, wherein the removing the multi-radio access technology header further comprising skipping other RLC layer functionality.

15. The method of claim 8, wherein the first radio access technology protocol layer is a medium access control (MAC) layer.

16. The method of claim 15, wherein, after the removing the multi-radio access technology header, the packet is treated as a MAC service data unit.

17. The method of claim 15, further comprising receiving an MAC protocol data unit (PDU) segment size for a transmission opportunity.

18. The method of claim 8, wherein the first radio access technology protocol layer is an internet protocol (IP) layer.

19. The method of claim 18, wherein a further multi-radio access technology protocol layer is used to handle radio access technology selection.

20. The method of claim 8, wherein the first radio access technology protocol layer is a multi-radio access technology protocol layer.

21. The method of claim 8, further comprising combining identical packets received from the first node and the second node.

22. A method for carrier aggregation at a user equipment operating in a mobile network having a first node with a first radio access technology and a second node with a second radio access technology, the method comprising:
- reporting that the user equipment is capable of inter-radio access technology carrier aggregation to the first node;
- receiving, at the user equipment, a connection request to connect to the second node, the connection request including connection information for the second node; and
- establishing a connection with the second node based on the connection information in the connection request;

wherein inter-radio access technology carrier aggregation allows for concurrent utilization of radio resources of the first radio access technology of the first node and radio resources of the second radio access technology of the second node.

23. The method of claim 22, wherein the connection information includes a random access preamble.

24. The method claim 22, wherein the connection information includes synchronization information for the second node.

25. The method of claim 22, further comprising, once the connection is established with the second node, transmitting identical data simultaneously to both the first node and the second node.

26. The method of claim 22, further comprising, once the connection is established with the second node, transmitting different data to each of the first node and the second node during a transmission time interval.

27. The method of claim 22, further comprising receiving, from the first node, an indication of whether communication with the second node is symmetrical.

* * * * *